US012061683B2

(12) United States Patent
Mahaffey et al.

(10) Patent No.: US 12,061,683 B2
(45) Date of Patent: *Aug. 13, 2024

(54) METHODS FOR MANAGING USER ACCESS TO COMPUTING DEVICES BASED ON EVALUATION OF AUTHENTICATION AND MAINTENANCE OF USER CONTROL

(71) Applicant: LOOKOUT, INC., Boston, MA (US)

(72) Inventors: Kevin Patrick Mahaffey, San Francisco, CA (US); Brian James Buck, Livermore, CA (US)

(73) Assignee: LOOKOUT, INC., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/317,760

(22) Filed: May 15, 2023

(65) Prior Publication Data
US 2023/0281290 A1 Sep. 7, 2023

Related U.S. Application Data

(63) Continuation of application No. 17/328,882, filed on May 24, 2021, now Pat. No. 11,934,509, which is a
(Continued)

(51) Int. Cl.
H04L 29/00 (2006.01)
G06F 21/35 (2013.01)
(Continued)

(52) U.S. Cl.
CPC .......... G06F 21/35 (2013.01); H04L 63/0853 (2013.01); H04L 63/105 (2013.01);
(Continued)

(58) Field of Classification Search
CPC ... G06F 21/35; H04L 63/0853; H04L 63/105; H04W 12/06; H04W 12/64; H04W 12/61; H04W 84/18; H04W 88/02; H04W 12/104; H04W 12/10; H04R 1/1008; H04R 1/1041; H04R 1/10; H04R 2420/05
See application file for complete search history.

(56) References Cited

U.S. PATENT DOCUMENTS 5,942,985 A * 8/1999 Chin .................. G07C 9/00309
340/10.33
7,868,238 B2 * 1/2011 Sugimoto ............ G10H 1/0008
84/645
(Continued)

FOREIGN PATENT DOCUMENTS

CN 101256700 A * 9/2008
CN 103049949 A * 4/2013

Primary Examiner — Don G Zhao
(74) Attorney, Agent, or Firm — Dergosits & Noah LLP

(57) ABSTRACT

The method disclosed herein provides for performing user authentication and maintaining user authentication and access to a second device based on the user maintaining control of a first device. The user's continued control may be based on determining the user's continued possession of the first device from the authentication to a pairing with the second electronic device which then causes a second security component executing on the second electronic device to change the second electronic device to an unlocked state.

6 Claims, 8 Drawing Sheets

Related U.S. Application Data continuation of application No. 16/430,188, filed on Jun. 3, 2019, now Pat. No. 11,017,069, which is a continuation of application No. 15/687,314, filed on Aug. 25, 2017, now Pat. No. 10,360,364, which is a continuation of application No. 15/219,171, filed on Jul. 25, 2016, now Pat. No. 9,763,097, which is a continuation-in-part of application No. 14/207,100, filed on Mar. 12, 2014, now Pat. No. 9,432,361.

(60) Provisional application No. 61/779,968, filed on Mar. 13, 2013.

(51) Int. Cl.
| | |
|---|---|
| *H04L 9/40* | (2022.01) |
| *H04W 12/06* | (2021.01) |
| *H04W 12/64* | (2021.01) |
| *H04R 1/10* | (2006.01) |
| *H04W 12/61* | (2021.01) |
| *H04W 84/18* | (2009.01) |
| *H04W 88/02* | (2009.01) |

(52) U.S. Cl.
CPC .......... *H04W 12/06* (2013.01); *H04W 12/64* (2021.01); *H04R 1/1008* (2013.01); *H04R 1/1041* (2013.01); *H04W 12/61* (2021.01); *H04W 84/18* (2013.01); *H04W 88/02* (2013.01)

(56) References Cited

U.S. PATENT DOCUMENTS

| | | | | |
|---|---|---|---|---|
| 9,031,533 | B2* | 5/2015 | Yajima | H04M 1/66 411/419 |
| 9,253,631 | B1* | 2/2016 | White | H04M 1/72457 |
| 2002/0137552 | A1* | 9/2002 | Cannon | H04M 1/7243 455/567 |
| 2002/0186845 | A1* | 12/2002 | Dutta | G06Q 20/3552 380/247 |
| 2005/0210283 | A1* | 9/2005 | Kato | G07C 9/00309 340/5.23 |
| 2005/0225427 | A1* | 10/2005 | Bell | G07C 9/28 340/5.2 |
| 2006/0028067 | A1* | 2/2006 | Otani | B60R 25/02144 307/10.1 |
| 2006/0205497 | A1* | 9/2006 | Wells | G07F 17/32 463/29 |
| 2009/0181641 | A1* | 7/2009 | Fiatal | H04M 3/4872 455/406 |
| 2011/0256848 | A1* | 10/2011 | Bok | G06F 3/048 455/411 |
| 2012/0009896 | A1* | 1/2012 | Bandyopadhyay | G06F 1/1686 715/764 |
| 2013/0045713 | A1* | 2/2013 | Foster | H04L 63/18 455/411 |
| 2013/0248601 | A1* | 9/2013 | Liang | G06K 7/10009 235/440 |
| 2013/0256256 | A1* | 10/2013 | Krippendorf | B65D 55/12 220/211 |
| 2014/0091903 | A1* | 4/2014 | Birkel | B60R 25/241 340/5.64 |

\* cited by examiner

METHODS FOR MANAGING USER ACCESS TO COMPUTING DEVICES BASED ON EVALUATION OF AUTHENTICATION AND MAINTENANCE OF USER CONTROL

CROSS-REFERENCE TO RELATED APPLICATIONS

This patent application is a continuation of U.S. patent application Ser. No. 17/328,882, entitled "METHODS FOR MAINTAINING USER ACCESS TO COMPUTING DEVICES BASED ON DETERMINING USER CONTROL," filed on May 24, 2021, now U.S. Pat. No. 11,651,062; which is continuation of U.S. patent application Ser. No. 16/430,188, entitled "METHOD FOR CHANGING MOBILE COMMUNICATIONS DEVICE FUNCTIONALITY BASED UPON RECEIPT OF A SECOND CODE AND THE LOCATION OF A KEY DEVICE, filed on Jun. 3, 2019, now U.S. Pat. No. 11,017,069; which is a continuation of U.S. patent application Ser. No. 15/687,314, entitled "METHOD FOR CHANGING MOBILE COMMUNICATION DEVICE FUNCTIONALITY BASED UPON RECEIPT OF A SECOND CODE," filed on Aug. 25, 2017, now U.S. Pat. No. 10,360,364; which is a continuation of U.S. patent application Ser. No. 15/219,171, entitled "METHOD FOR PERFORMING DEVICE SECURITY CORRECTIVE ACTIONS BASED ON LOSS OF PROXIMITY TO ANOTHER DEVICE," filed on Jul. 25, 2016, now U.S. Pat. No. 9,763,097; which is a continuation-in-part of U.S. patent application Ser. No. 14/207,100, entitled "SYSTEM AND METHOD FOR CHANGING SECURITY BEHAVIOR OF A DEVICE BASED ON PROXIMITY TO ANOTHER DEVICE," filed Mar. 12, 2014, now U.S. Pat. No. 9,432,361; which claims priority to U.S. Provisional Patent Application 61/779,968, filed Mar. 13, 2013; each of which is incorporated by reference along with all other references cited in this application.

TECHNICAL FIELD

The present invention relates to the field of information technology, including, more particularly, to systems and techniques for changing a security characteristic of a component based on a location of another component.

BACKGROUND OF THE INVENTION

Mobile electronic communications devices have evolved beyond simple telephone functionality and are now highly complex multifunctional devices with capabilities rivaling those of desktop or laptop computers. In addition to voice communications, many mobile communications devices are capable of text messaging, e-mail communications, internet access, and the ability to run full-featured application software. Mobile communications devices can use these capabilities to perform online transactions such as banking, stock trading, payments, and other financial activities. Furthermore, mobile communications devices used by an individual, a business, or a government agency often store confidential or private information in forms such as electronic documents, text messages, access codes, passwords, account numbers, e-mail addresses, personal communications, phone numbers, and financial information.

Typically, when a mobile communications device has not been used for a period of time or when it is powered on, it is placed in a locked mode to prevent unauthorized use and to protect the device owner's private information stored on the device. In order to unlock the device, a user typically must enter an unlock password. In most cases, the device's owner creates the password, which is some combination of characters on a keyboard. When a strong, i.e., difficult to guess, password is created, the device and its contents can be better protected from malicious use.

In addition to protecting electronic devices from unauthorized and/or malicious use, passwords also protect user accounts and/or applications provided by cloud-based online services and/or application servers. For example, as noted above, online banking, payments, and financial services are common, and electronic access to those services and accounts are also password protected. Because many of those accounts provide access to private and sensitive information and significant opportunity for malfeasance, strong password protection is highly recommended, if not required.

Creating strong and long passwords for the user's electronic devices and for the user's online accounts enhances user security and prevents others from misappropriating the user's information. These passwords, however, usually take more time to enter, and are usually difficult to enter correctly. Because of this, the user might be tempted to deactivate the locking mode and/or to create a simple, i.e., weak, password—thereby sacrificing security for convenience. This is undesirable.

What is desired, therefore, is a method for automatically performing security features on a user's electronic device based on the detection of the presence of another device, such as a key device.

BRIEF SUMMARY OF THE INVENTION

According to an embodiment, a method for performing device security corrective actions on a device based on the loss of proximity to another device, such as a key device, is provided. In this embodiment, when the absence of the key device is detected by the electronic device (referred to as a "target device"), a user of the target device who is presumably not in proximity to the target device can prevent the target device from performing device security corrective actions and/or change which device security corrective actions will be performed. The user may receive a notification based on the absence of the key device and respond to the notification to prevent the target device from performing a device security corrective action. If the user does not respond to the notification, the target device may perform the device security corrective actions. In an embodiment, the key device can be a dedicated device. In another embodiment, the key device can be embedded into another personal electronic device associated with the user, e.g., a smart phone, a car fob, or any other personal item typically carried by the user.

According to another embodiment, a system for automatically unlocking an electronic device based on the detection of the presence of another device (referred to as a "key device") is provided. In this embodiment, when the presence of the key device is detected by the electronic device (referred to as a "target device"), a user of the target device is presumably in proximity to the target device and the target device can automatically change its state from locked to unlocked; and so long as the key device is within a specified distance and/or so long as the user's presence is detected within the specified distance, the target device can suppress the lock mechanism.

According to an embodiment, when the presence of the key device/user is detected, the target device can be configured to launch specified features provided by the target device, or provided by other services controlled by the target device. In an embodiment, the specified features and/or services can be associated with the key device, where different key devices can launch different features and/or services. For example, different features and/or services can be provided by the target device to a first user (parent) than to a second user (child).

In an embodiment, when the presence of the key device and/or of the user is no longer detected by the target device, the target device can automatically change its security behavior to protect the resources of the device. For instance, the target device can enter a locked mode or can enter a sleep/hibernate mode which requires log in credentials to awaken the device.

In a specific embodiment, the security and convenience of a mobile communications device is enhanced based on a separate key device. If the key device is near the mobile communications device, the mobile communications device may be automatically unlocked without the user having to input an unlock code. The mobile communications device may be automatically unlocked into a first mode having a first level of functionality. If the user inputs a correct unlock code, the mobile communications device may be unlocked into a second mode having a second level of functionality, greater than the first level of functionality.

Authentication methods used today on mobile devices, laptops or tablets, websites, web apps, or other systems are inconvenient to the user, may have high implementation costs, and have security weaknesses; i.e., they are not as secure as they could be. To perform authentication of a user, the user can provide something that the user knows (for example, a PIN or password or answer to a secret question), or something that the user is (for example, a biometric such as a fingerprint, or a retinal scan, or a DNA sample or an electrocardiogram, or a brainwave, or the user's face for a facial recognition system, or an observable behavioral trait such as the user's gait while walking or the result of the user creating a signature with a pen), or something that the user has (a key card, a smart card, a device such as a smartphone, an RFID or NFC tag, a physical key that unlocks a physical lock, etc.). The above forms of user authentication may be used in combination with each other for a more stringent level of authentication. But the conflict between convenience and cost versus strength of security for authentication systems has traditionally led to authentication system implementations that have sacrificed strength of security for increased user convenience and lowered implementation cost. The user convenience factor has become more important over the years as users are called upon to interact with more and more different systems to accomplish work and personal tasks, and as users are employing more devices (smartphones, tablets, PCs, smart watches, and so on) to access them, thus requiring very many separate authentication events during a user's day.

The first of the three fundamental authentication techniques, having the user provide something that the user knows, suffers greatly from the user inconvenience factor. Users have a hard time generating or remembering long and strong passwords, and thus tend to reuse passwords across systems, to derive them from pieces of publicly discoverable information about a person (e.g., birthdate), and to keep them as short as possible for memorization purposes. Additionally, because users have to enter a password so many times during the day, e.g., on a smartphone which may be configured to lock after 5 minutes of idle time, that users are further driven to keep their passwords very short, very easy to type in on a smartphone (not using special characters, numbers, and both upper and lower case letters, because that is harder to type on a smartphone soft keyboard), or even to use a simple four digit PIN instead of a password, or even worse, to not have a passcode of any sort on the user's smartphone. Additionally, a user's password can quite easily be lost or stolen (when written down to help the user remember), can be guessed, or can be willingly lent to a person who is not authorized to access a system. Relying only upon something that a user knows (and is willing to remember and to type in) makes for a weak authentication system.

The second of the three fundamental authentication techniques, having the user provide something that the user has, suffers from the assumption that the person who is in possession of the "something" (a device or token or other object) is in fact in authorized possession of the device or token or other object. But such devices, tokens, or objects may be easily lost or stolen, or lent to a different user in a well-meaning helpful gesture or as a result of a social engineering attack. The unstated assumption of such an authentication technique is that such loss of possession events either will not happen, or if they do, they will quickly be discovered, suitably and promptly reported, and the associated authentication credentials for the device, token or object will be revoked in a timely manner. Relying only upon something that a user has in an authentication system has significant weaknesses.

The third of the three fundamental authentication techniques, having the user provide something that the user is, suffers from both the user inconvenience problem and the cost of implementation problem. While it would be highly secure for an authentication system to employ a retinal scan or verify a DNA sample of a user, the costs of implementation have historically been so high as to preclude their use in all but the most sensitive systems and impossible in mobile environments, to say nothing of the user inconvenience factor in providing this type of biometric input.

What is needed is an authentication system which can support the user knowing and using a strong password because the user has only one such password to enter, can greatly reduce user inconvenience by hardly ever requiring the user to input such a password, and can cost efficiently use multiple other factors for authentication while minimizing user inconvenience.

As will be discussed below, the system described in this application employs user authentication in various combinations with acceptable proximity determination, acceptable person presence at and possession of a device or token or other object, and other factors to extend the realm of what is possible in authentication, authorization, and changing security and operational settings of devices. The terms "acceptable proximity," "acceptable presence," and "acceptable possession" are explained further on in the specification. The system is more secure regarding the use of something the user has, by using acceptable proximity detection and person presence and possession monitoring to verify that only an authenticated user is in possession of a device or token or object used to aid in authentication. The system takes advantage of the increasingly inexpensive and widely deployed sensor systems which are integrated as part of devices such as smartphones to detect events which can indicate a person's presence at a device, or acceptable proximity of two devices to each other.

DETAILED DESCRIPTION

Figure 1:
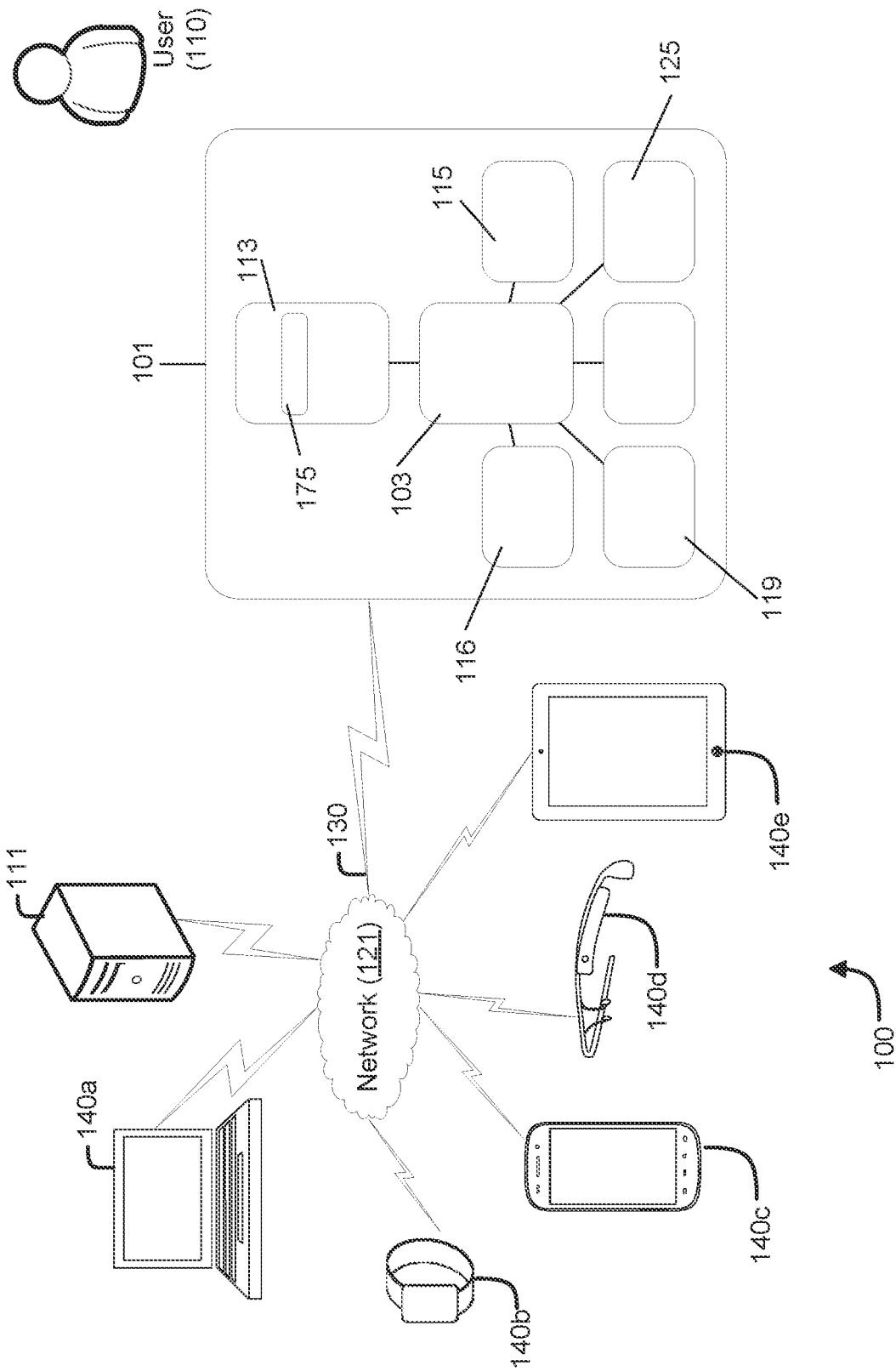
FIG. 1 is a simplified block diagram illustrating an exemplary system including an electronic device and a server coupled to a network according to an embodiment.

FIG. 1 is a simplified block diagram of a computer network 100 that includes a mobile communications device 101, a server system 111, and other electronic client devices 140a-140e, coupled to a communication network 121 via a plurality of communication links 130. Communication network 121 may be comprised of many interconnected computer systems and communication links. Communication links 130 may be hardwire links, optical links, satellite or other wireless communications links, wave propagation links, or any other mechanisms for communication of information. Various communication protocols may be used to facilitate communication between the various devices shown in FIG. 1. These communication protocols may include TCP/IP, HTTP protocols, wireless application protocol (WAP), vendor-specific protocols, customized protocols, Internet telephony, IP telephony, digital voice, voice over broadband (VoBB), broadband telephony, Voice over IP (VoIP), public switched telephone network (PSTN), and others. While in one embodiment, communication network 112 can be the Internet, in other embodiments, communication network 112 may be any suitable communication network including a local area network (LAN), a wide area network (WAN), a wireless network, an intranet, a private network, a public network, a switched network, and combinations of these, and the like.

In an embodiment, the mobile device 101 includes: an operating system 113, an input device 115, a radio frequency transceiver(s) 116, a visual display 125, and a battery or power supply 119. Each of these components is coupled to a central processing unit (CPU) 103. The device operating system 113 runs on the CPU 103 and enables interaction between application programs and the mobile device hardware components. In an embodiment, the mobile device 101 receives data through an RF transceiver(s) 116 which may be able to communicate via various networks, for example: BLUETOOTH, local area networks such as Wi-Fi, and cellular networks such as GSM, CDMA or LTE.

In an embodiment, a local software component 175 is an application program that is downloaded to a mobile device and installed so that it integrates with the operating system 113. Much of the source code for the local software component 175 can be re-used between various mobile device platforms by using a cross-platform software architecture. In such a system, the majority of software functionality can be implemented in a cross-platform core module. The cross-platform core can be universal allowing it to interface with various mobile device operating systems by using a platform-specific module and a platform abstraction module that both interact with the mobile device operating system 113, which is described in U.S. patent application Ser. No. 12/255,626, entitled "SYSTEM AND METHOD FOR A MOBILE CROSS-PLATFORM SOFTWARE SYSTEM." In another embodiment, the local software component 175 can be device, platform or operating system specific.

As indicated above, the mobile device 101 may operate in a networked environment using logical connections 130 to one or more remote nodes 111, 140a-140e via a communication interface. The remote node may be another computer 140a, a server 111, a router, a client device 140b-140e or other common network node, and typically includes many or all of the elements described above relative to the mobile device 101. The communication interface may interface with a wireless network and/or a wired network. Examples of wireless networks include, for example, a BLUETOOTH network, a wireless personal area network, a wireless 802.11 local area network (LAN), a near field communication (NFC), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like.

In an embodiment, the server 111 can be a device that the user 110 can carry upon his person, or can keep nearby. The server 111 may have a large battery to power long distance communications networks such as a cell network or Wi-Fi. The server 111 may communicate with the other components of the personal mobile device system via wired links or via low powered short range wireless communications such as BLUETOOTH. Alternatively or in addition, one of the other components of the personal mobile device system may play the role of the server, e.g., the watch 140b, the head mounted device/glasses 140d, the phone 140c, the tablet 140e, and/or the PC 140a.

In either case, the server 111 may be kept in the user's pocket, bag, or purse. This allows a large and therefore heavier battery to be used to power long distance network communications. The other individual components require lower power to communicate with the server 111 and thus can use smaller and therefore lighter batteries. Also, this removes the high intensity radiofrequency signals from the close vicinity of the user's head.

It should be understood that the arrangement of mobile communications device 101 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of mobile device 101. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the device, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

Figure 2:
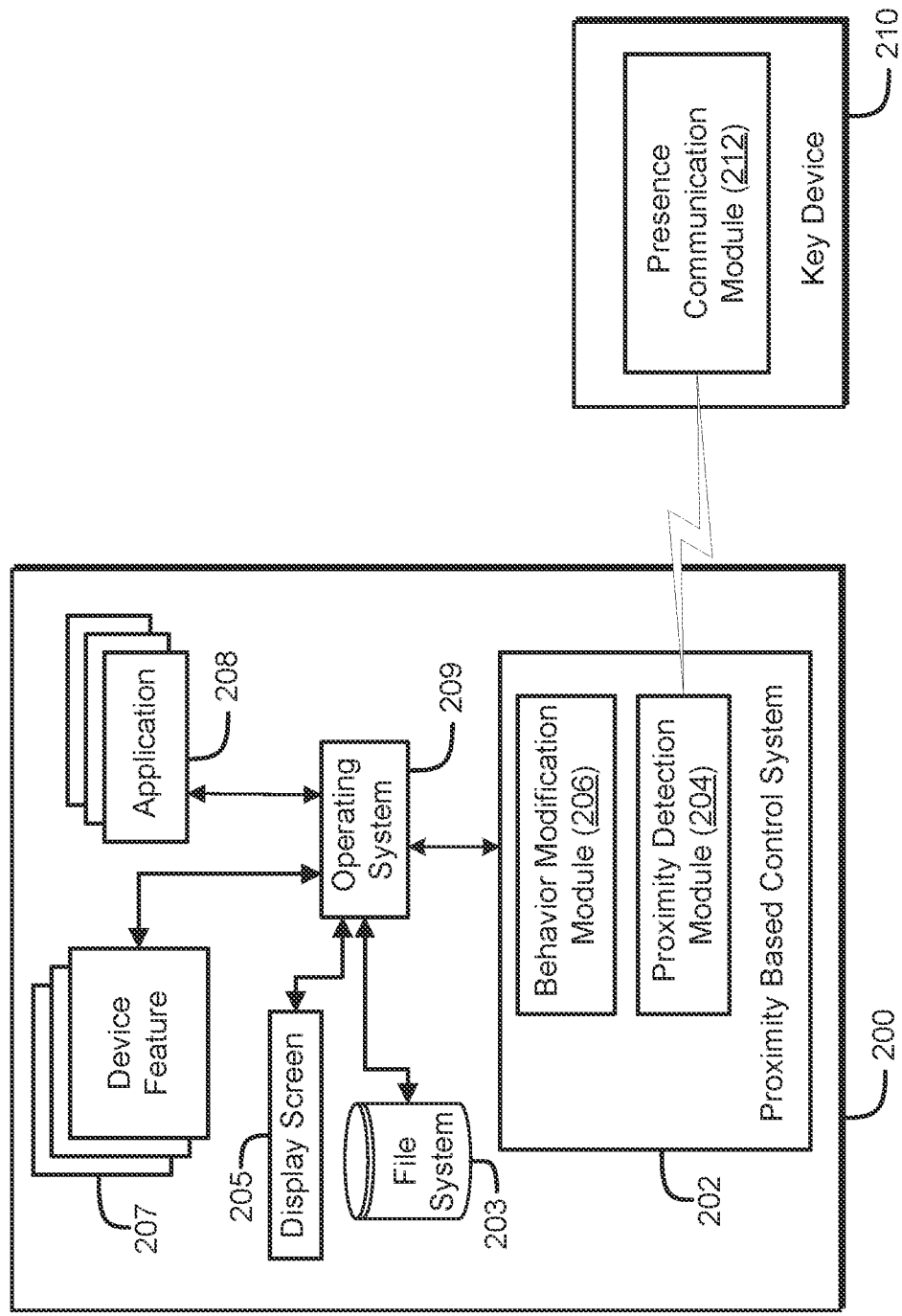
FIG. 2 is a block diagram illustrating of a specific implementation of a system of the invention according to an embodiment.

FIG. 2 is a simplified block diagram illustrating a system for changing a security behavior of a device based on proximity of another device according to an embodiment. As is shown in FIG. 2, the system includes a target device 200 and a key device 210. In an embodiment, the target device 200 can be the mobile communications device 101, any one of the other electronic client systems 140a-140e, or the server 111. Accordingly, the target device 200 can include a file system 203, a display screen 205 and an operating system 209 that supports various device features 207 and/or applications 208. The key device 210 can be a portable electronic device that can be easily carried in a user's pocket, wallet, purse or other personal item. In an embodiment, the key device 210 can be a dedicated stand-alone device such as a card or a key chain. Alternatively, it can be integrated with another portable electronic client device associated with the user, e.g., the user's smart phone, car fob, or any other personal item typically carried by the user 110.

According to an embodiment, a user 110 of the target device 200 can specify whether another device, e.g., the user's phone 140c, is a key device 210 and if so, whether that key device 210 has full privileges or limited privileges. Alternatively or in addition, whenever the other device is detected, e.g., via BLUETOOTH or NFC technology, the target device 200 can require user confirmation and can require the user 110 to indicate whether Data Loss Prevention ("DLP") protection should be in force for the device 200 (BLUETOOTH firewall of sorts), whether proximity login will be enabled, and if so, whether it should be enable for a specific time period.

For example, when a target device 200 detects a first device for the first time, the user 110 can indicate, in an embodiment, whether the first device is a key device 210, and if so, whether it triggers proximity login for an unlimited period of time, or for a limited period of time. In addition, when the first device is initially paired with the target device 200 and the first device is registered as a key device 210, the user 110 (or a policy provided by an administrator) can specify whether there should be DLP protection in force for communications to the first device, thereby preventing Personally Identifiable Information ("PII") or other sensitive information from flowing over a communications channel from the target device 200 to the first device 210.

In an embodiment, the target device 200 includes a proximity based control system 202 and the key device 210 includes a presence communication module 212. According to an embodiment, the target device 200 is configured to detect, via the proximity based control system, the presence of the key device 210. In an embodiment, the target device 200 can be configured to detect the presence of the key device 210 in a variety of ways.

For example, the proximity based control system 202 in the target device 200 can include a proximity detection module 204 that is configured to determine whether the key device 210 and the target device 200 are connected to the same network 121. In an embodiment, the presence communication module 212 in the key device 210 can broadcast or multicast a message to a network that it is present and/or the target device 200 can broadcast or multicast a request message to the network that it is looking for a key device 210. When the target device 200 receives the message from the key device 210 or a response to its request message (from the key device 210), the proximity detection module 204 can store the MAC address of the key device 210 and use ARP to determine whether its IP address is connected to a local network segment. Alternatively, the proximity detection module 204 can perform a DNS, multicast DNS, WINS, or another network naming service lookup. When both devices 200, 210 are coupled to the same Wi-Fi access point or to the same network segment, e.g. IP block 192.168.1.1-255 with netmask 255.255.255.0, they can be considered connected to the same network 121, and therefore in proximity to one another. Aspects of the system described in this patent application can be applied to determinations of proximity of any two devices, not necessarily just a "key" device and a "target" device.

In another embodiment, when both devices 200, 210 are coupled to the same cellular base station, e.g. micro/pico/femto cell, they can be considered connected to the same network 121. In yet another embodiment, both devices 200, 210 can transmit data to a server 111, and when the server 111 determines that the devices 200, 210 are connected via the same network 121, it can send an indication to the target 200 and/or the key 210 devices that they are connected to the same network 121. In an embodiment, the server 111 can make this determination based on the public IP addresses seen as the source of traffic, based on a nearby IP address as seen by the server, and/or based on network-augmentation of packets that reports routing or location, e.g. attached in the IP header.

When both devices 200, 210 are connected to the same network, the proximity detection module 204 can authenticate the key device 210 in an embodiment. For example, network infrastructure specific to the network can be used to authenticate the key device 210, e.g. using NAC, 802.1X, or using cellular network standard authentication, such as GSM authentication. Other authentication techniques are available and described below.

When the devices 200, 210 are determined to be on the same network 121 and optionally authenticated, the proximity detection module 204 in the target device 200 can continue to monitor the presence, e.g., the connectivity onto the network, of key device 210. For example, in an embodiment, a persistent TCP connection between the devices 200, 210 can be maintained with short timeouts between data or keep-alive transmissions, so that when a device leaves the network segment, both devices can react quickly. Alternatively or in addition, the key device 210 can transmit periodic broadcast, multicast, or unicast traffic indicating its presence, and when no traffic is received for a specified period of time, the target device 200 can conclude that the key device 210 has disconnected and is no longer in proximity. In another embodiment, a network node, e.g. a router or Wi-Fi controller, can send messages to the network indicating disconnection/connection events for particular client devices. These messages may contain the identity of the device, e.g. determined by 802.1X, and may also be digitally signed to guarantee authenticity.

Alternatively or in addition, the target device 200 can be configured to detect the presence of the key device 210 via a peer-to-peer wireless protocol/network, such as BLUETOOTH and/or Near Field Communication (NFC). In an embodiment, the presence communication module 212 can be configured to transmit and receive various signals to announce its presence to any listening devices. Thus, according to an embodiment, one or both devices can page the other frequently given the other's device address via a BLUETOOTH connection over a wireless personal area network ("WPAN"), or piconet. When a key device 210 is detected, it can be authenticated, and its proximity can be monitored. Proximity monitoring can include, but is not limited to:

Using time delay (e.g. in GSM networks)
Using geolocation techniques
Using response time as a measure of distance
Using SNR or absolute signal strength
Periodic communications with timeout that, if reached, indicates that the key device 210 is no longer in proximity. Communications can be handled by a radio controller (e.g. BLUETOOTH radio) or by application layer (e.g. if using BLUETOOTH, can be a L2CAP Echo request or RFCOMM channel with periodic data transmitted between devices).

According to an embodiment, the BLUETOOTH target 200 and key 210 devices can maintain a continuous connection. This, however, consumes a large amount of power in both devices over time. Alternatively, the target device 200 can perform periodic checks at configurable time intervals to confirm that the key device 210 is still in proximity. Alternatively or in addition, the target device 200 can be prompted to check at the occurrence of certain events. For example, when a screen lock timer would otherwise lock the target device 200, the target device 200 can check at this time whether the key device 210 is still in proximity; and if so, can prevent the device lock, and if not, can allow the device to lock. Similarly, when an unlock screen is to be presented to the user on the device 200, the target device 200 can check at this time whether the key device 210 is still in proximity, and if so, can bypass the presentation of the unlock screen. In another embodiment, the target device can present a button on the unlock screen to "check for key." When the user selects this button, a check can be made for the presence of the key device 210, and if detected, the unlock screen can be bypassed.

In another embodiment, the target device 200 can be configured to detect the presence of the key device 210 using Near Field Communication (NFC) technology. In this case, detection is based on the presence of one device, e.g., the key device 210, in another device's "near field," with either load or modulated data being a signal of presence. (See NFC standards for more information on how this works). According to an embodiment, simply bringing the key device 210 into the target device's near field area allows both devices 200, 210 to determine that the other is nearby. Once detected, the devices 200, 210 can be authenticated, e.g., see ISO 14443 (http://en.wikipedia.org/wiki/ISO/IEC_14443; http://www.waazaa.org/download/fcd-14443-3.pdf), and MIFARE (http://en.wikipedia.org/wiki/MIFARE). In an embodiment, proximity monitoring can be based on physical presence of the key device 210 in the target devices 200 near field and/or based on periodic data exchanges between one or both of the devices 200, 210.

In another embodiment, the target device 200 can be configured to detect the presence of the key device 210 using far field detection techniques that use RF backscatter to send information to a source. For example, UHF and/or microwave RFID systems can be implemented on the devices 200, 210 such that an RF reader in the target device 200 can detect the presence of a tag in the key device 210. After the key device 210 is authenticated, its proximity can be monitored by receiving periodic backscatter from the key device 210 indicating that the device 210 is still within the target device's proximity.

As indicated above, when the target device 200 detects the presence of the key device 210, the target device 200 authenticates the key device 210. According to an embodiment, the authentication process can be a one-way process that where the key device authenticates itself to the target device, and when the authentication is complete, the target device unlocks. Alternatively, the process can be a mutual/two-way process where the key device and target device mutually authenticate before the key device transmits an encryption key to the target device so that the target device can decrypt a portion of its storage.

Various authentication processes can utilize various types of data to verify the authenticity of the devices 200, 210 and/or user 110. For example:

a device can provide an identification number (e.g. MAC address, card identifier, EPC code) explicitly or as part of its communication with the other device
a device can provide a secret code/key, which is matched a secret code/key in the other device
mutual certificate verification (e.g. using TLS/SSL) can be performed where both devices can validate the chain of trust of the certificates each supply.
an encrypted payload can be transmitted from one device to another device having a decryption key (symmetric or asymmetric), and where successful decryption of the payload indicates a knowledge of a shared secret (symmetric key encryption) or a private key (asymmetric key encryption), thereby proving authenticity
each device can sign and encrypt data using each other's public keys.

Alternatively or in addition, when the proximity of the key device 210 detected and authenticated, the proximity based control system 202 can be configured to prompt the user 110 to provide information known to the user 110 and to the device 200 to authenticate the user 110. Thus, the change in the security behavior of the target device 200 will be implemented only when the user 110 provides the appropriate information. In another embodiment, when the key device 210 is a user's client device, e.g., a phone 140*c*, the key device 210 can itself supply the additional information known to the user 110, e.g., that the user is currently logged in to the phone. In this case, the detection of the presence of the key device 210 indicates that the user 110 has the key device 210. Through communications between the target device 200 and the key device 210, the behavior medication module 206 can determine information indicating that the user 110 is logged in to the key device 210 and that therefore, the user 110 knows information. Therefore, what the user has coupled with what the user knows triggers the change in the security behavior of the target device 200.

Alternatively or in addition, the proximity based control system 202 can change a level of authentication based on a geo-location of the target device 200. For instance, when the device 200 is in proximity to a secure location, the additional authentication required for the device 200 can merely be a pin code. Otherwise, the authentication for the device 200 requires a multi-faceted authentication.

Once a device is detected and authenticated as a key device 210 for the target device 200 and optionally after additional user information is received and verified, a security setting of the target device 200 may be changed. In an embodiment, the proximity based control system 202 can include a behavior modification module 206 configured to change the security behavior of the target device 200 when the key device 210 is in proximity of the target device 200 and optionally when additional information is received.

For example, in an embodiment, when the target device 200 is configured to enter a locked mode after a period of inactivity, the behavior modification module 206 can change an "idle timeout" feature 207 when the proximity criteria is satisfied, i.e., the key device 210 is in proximity and optionally the additional information is received and verified. In an embodiment, the behavior modification module 206 can be configured to change and later restore the operating system (OS) idle timeout configuration parameters. In this case, the original idle timeout period parameters can be saved, and then the OS APIs can be used to either disable/turn off or modify the idle timeout period to one sufficiently long that it will not expire while the user 110 is using the target device 200, e.g., 24 hours. For example, in Windows, the Console lock display off timeout parameter can be disabled or modified. Later, when the presence key device 210 which provides evidence of continued user presence is no longer detected, the original timeout period parameters can be restored, and optionally the device can be immediately locked.

In another embodiment, the behavior modification module 206 can be configured to emulate user activity to prevent an inactivity timer, e.g., the OS based idle timeout feature, from expiring. For example, in a Windows environment, user interaction messages such as WM_MOUSEMOVE can be inserted. Alternatively or in addition,
SetThreadExecutionState(ES_DISPLAY_REQUIRED)
or
SetThreadExecutionState(ES_SYSTEM_REQUIRED)
or
SetThreadExecutionState(ES_CONTINUOUS) can be called to prevent a screen saver lock from engaging. In this case, SetThreadExecutionState( ) may need to be called periodically to prevent the system from entering a sleep or lock state. Alternatively or in addition, a hook in a user input device driver may be used to generate what looks to the OS like human input device hardware interrupts that, as a result, reset inactivity timers.

In an embodiment, the change in behavior of the target device 200 can also be based on a characteristic or attribute of the key device 210 and/or the user 110. For example, when the proximity of the key device 210 is detected, but the user 110 is not authenticated, e.g., the user 110 is unable to provide appropriate authentication information, the behavior modification module 206 can be configured to allow only the most basic functions or no functions at all. When the user 110 can be authenticated, the behavior modification module 206 can allow varying levels of access and functionality to the user 110 based on what the user knows, who the user is and/or combinations of such. Alternatively or in addition, access to functions and features of individual applications can be controlled based on what the user knows, who the user is, and/or both. For example, an application 208, e.g., a browser, may have a first function, e.g., web browsing, that is accessible by an unauthenticated user 110, and a second function, e.g., accessing a bookmark or making a new bookmark or changing a browser setting, that is accessible by only an authenticated user who knows something, and a third function, e.g., uninstalling the application or erasing browser history, that is accessible by only an authenticated user who knows something and who is something. Features 207 and/or applications 208 to which a user 110 does not have access may be hidden, or may be displayed, but if invoked, would require the additional missing level of authentication to be obtained from the user 110.

Moreover, the change in behavior of the target device 200 can also be based on a geo-location of the target device 200. For example, when the target device 200 is near a specified landmark, e.g., home or office, a region or a geofence, the behavior of the target device 200 can be modified to suit the characteristics of the specified landmark. In an embodiment, a GPS unit or other geo-location module in the target device 200 can collect geo-location information associated with the device 200. The target device 200 can transmit its geo-location information to a server 111, which can determine whether the target device 200 is in proximity to a given region or landmark and can transmit this determination back to the target device 200. Alternatively, the target device 200 can make this determination locally based on the geo-location information.

Accordingly, in the case regarding changes to the idle timeout feature 207 of the target device 200, when the key device 210 is detected and when the target device 200 is located in the user's home or work office, the behavior modification module 206 can be configured to disable the feature 207. Alternatively, when the target device 200 is located in a public place, the feature 207 can be enabled and a short idle timeout period can be applied.

In another embodiment, when the key device 210 is detected but the geo-location of the target device 200 is not near a specified landmark, e.g., the office and/or a certain country, the behavior modification module 206 can place the target device 200 in absolute lockdown mode, i.e., in an inoperable state. In this case, the behavior modification module 206 can lock the device 200 immediately and/or implement a hardware lockdown which can prevent an element of the device from booting or otherwise enabling an operating system 209 unless the proximity criteria is satisfied. In an embodiment, programming code can be inserted or enabled as part of the boot sequence for the device 200. This can be logic in hardware (e.g. ROM) or in the BIOS (part of the boot sequence on the device) or anywhere in the device's particular boot sequence that takes control and executes prior to loading any operating system 209, whether from the device 200 or via any attached external media, e.g., logic in a virtual machine that takes control prior to booting an operating system 209. The inserted/enabled code can ensure that the proximity criteria is satisfied, in which case it will allow the boot sequence to proceed. Otherwise, it will prevent the boot sequence from proceeding and no operating system 209 will boot.

Alternatively or in addition, the operating system 209 may also contain code that disables itself (e.g. a device driver that interrupts the boot sequence or disables any user-interactive features of the device while preserving network and location capabilities). In an embodiment, the device 200 can be configured in such a way that the device cannot be reset or have its firmware flashed while in a lockdown mode. For example, a configuration parameter that determines whether a device is in lockdown can be stored in memory that is not wiped when the device performs a "master clear", "wipe", "restore to factory defaults", or other full reset operation. In this case, even performing such a wipe will not disable the lockdown. Furthermore, the device's bootloader may check for this configuration parameter and disable firmware flashing if it is set. A recoverable bootloader may require an authentication credential, e.g. digital signature or password, to allow even a locked down device to be recovered by an authorized party.

Alternatively, or in addition, the behavior modification module 206 can control access to certain types of data stored on the target device 200. For example, the behavior modification module 206 can allow access to an encrypted container only when the key device 210 is detected and when the user 110 is authenticated. Such access can also be denied or granted when the geo-location of the target device 200 is or is not near a specified landmark. In an embodiment, the behavior modification module 206 can allow access to specific files in the file system 203, can launch any applications 208, and/or can allow the user to perform any other action involving sensors, attached devices, etc. Alternatively, secure resources, e.g., files and/or applications, can be placed in a container controlled by the behavior modification module 206. The container can be an encrypted portion of the file system 203 such that decryption and thus access to the files or applications is controlled by the behavior modification module 206.

In an embodiment, the location policy may be implemented as part of Saline or SEAndroid so that a system wide mechanism (e.g. kernel) enforces the policy and is configurable by a system wide policy file or is configurable dynamically by an application. Alternatively, the policy may be implemented so that the kernel delegates a policy decision to a user-mode application. A further alternative provides a first application controlling access to a secure resource by other applications. In this case, the first application can enforce a policy that defines what other applications and in what contexts (e.g. location, proximity) access to the resource should be granted. In an embodiment, the first application can consult a server in order to grant access, for example, by retrieving an encryption key from the server in order to decrypt a secure container. In an embodiment, the server can enforce the proximity criteria based on information provided by the first application or otherwise available to the server. For example, the server may use an out of band mechanism to locate the key device. Such a mechanism can be one that is described in patent application Ser. No. 13/162,477, filed Jun. 16, 2011, entitled "Mobile Device Geolocation," U.S. patent application Ser. No. 12/372,719, filed Feb. 17, 2009, now U.S. Pat. No. 8,467,768, issued Jun. 18, 2013, entitled, "System And Method For Remotely Securing Or Recovering A Mobile Device," U.S. patent application Ser. No. 13/423,036, filed Mar. 16, 2012, Ser. No. 13/410,979, filed Mar. 2, 2012, Ser. No. 13/842,884, filed Mar. 15, 2013, and Ser. No. 13/849,379, filed Mar. 22, 2013, which are incorporated by reference along with all other references cited in this patent application.

According to an embodiment, the security behavior changes implemented by the behavior modification module 206 can remain in effect so long as the user 110 is present. As mentioned above, the user's presence can typically be linked to the presence of the key device 210. Various ways in which the target device 200 can monitor the presence of the key device 210 are mentioned above. In another embodiment, the presence of another device (referred to as a "presence device") and/or its respective state can also be indicative of the user's presence, and the proximity detection module 204 can be configured to detect the presence and state of the presence device to determine whether the user 110 is present.

For example, when the target device 200 is a PC 140*a* and the presence device is the user's phone 140*c*, the proximity detection module 204 in the PC 200 can detect the presence of the phone 140*c* and the current state of the phone 140*c*. In an embodiment, the current state of the phone 140*c* can be determined by sensor readings provided by sensors in the phone 140*c*, e.g., an accelerometer or a camera, that indicate that the user is interacting with the phone 140*c* and therefore present. Accordingly, while the user 110 may not be currently interacting with the PC 200, the combination of proximity and current state of the other device 140*c* can be sufficient to provide evidence of the presence of the user 110, which then prevents an automatic time-out/locking event of the target device/PC 200.

In an embodiment, the presence device used to monitor the user's presence can be one that is not suitable as a key device 210, and yet is suitable for indicating the user's presence. For example, a set of headphones that contain an accelerometer do not require login for use, and thus do not provide evidence of something the user knows, and would not ordinarily be used for providing evidence of initial presence. Nevertheless, the headphones can provide evidence that the user 110 is present when they are connected to one or more of the devices in the set of user's devices requiring continued presence, and when the accelerometer shows movement of the user's head while wearing the headphones. Other examples of sensors that can provide supporting evidence are temperature, blood pressure, and/or mechanical strain gauges (the headphones are worn on the user's head instead of resting on a desk).

According to an embodiment, so long as the user 110 is interacting with the target device 200, the key device 210 and/or the presence device, the current states of the device(s) provide evidence of a continued user presence, and a time-out or automatic lock of either device(s) is prevented. But if the current state of all of the devices change to show no interaction, then even though the devices are still in physical proximity, they no longer provide any evidence of continued presence of the user 110. There is the notion of a set of devices or sensors or tokens in a vicinity which can provide evidence of presence. For example, a camera in a PC or phone may detect the presence of a body or face in the field of view of the camera, which can be evidence, after a user has been determined to be present, in proximity, and also authenticated, that the user is still present. Thus, the current state of the camera's sensor readings can provide evidence of continued presence of the user. Other devices which could provide such evidence are the land line telephone on a user's desk. In this case, if the telephone is put into use during a time when the user is known to be present, then the continued use of the telephone provides some evidence of the continued presence of the user 110.

According to an embodiment, when the presence of a previously detected key device 210 or optionally the presence of a previously detected presence device is no longer detected, the user 110 may no longer present. In an embodiment, the absence of a particular device (referred to as an "absence device") is highly indicative of the user's absence and the proximity detection module 204 can be configured to detect the presence/absence of the absence device. In an embodiment, the absence device can be the user's phone 140c or the user's watch 140b, and when the presence of either or both is no longer detected, the proximity detection module 204 can conclude that the user 110 is no longer present. When the user 110 is no longer present, the security behavior of the target device 200 can be changed again. In this situation, for example, the behavior modification module 206 can be configured to immediately lock the target device 200, to shut down the target device 200, or to enter a sleep/hibernate mode in an embodiment.

According to an embodiment, when the target device 200 is powered on from a shutdown state, the target device 200 can detect a key device 210 already in proximity and proceed from there in the same fashion as if it had already been powered on when the key device 210 was brought within its vicinity. In another embodiment, when the target device 200 is in the sleep/hibernate mode, it can continue to search for the presence of the key device 210, and can wake up when the key device 210 is detected. Alternatively, a power strip into which the target device 200 is plugged can detect the presence of the key device 200 and turn on power to the target device 200 upon detection.

In another embodiment, when the presence of a key device 210 is not detected within a specified destruction time interval, the behavior modification module 206 can spontaneously change the security behavior of the target device 200. For instance, when the target device 200 has not detected the key device 210 within in 24 hours, the behavior modification module 206 can digitally destroy the target device 200 by, e.g., erasing data, forgetting keys, corrupting the firmware, blowing a fuse, and/or marking bits in secure regions of protected non-volatile memory. In an embodiment when the target device 200 is awake and active, the behavior modification module 206 can initiate the required configured destruction actions when the specified destruction time interval expires. In another embodiment, to prevent a power cycle (power off, power on) from defeating this time-based self-destruction policy, the target device 200 can be configured, as described above, with code to execute proximity criteria as part of the device boot sequence. In a subsequent attempted power on or boot sequence, when the code determines that the key device 210 is not present and that the destruction time interval has expired, the destruction actions configured are performed.

In another embodiment, the target device 200 itself can be configured with anti-tamper features to augment this protection, by ensuring that any physical modification of the device (even when unpowered) will destroy the device and/or data. There are well known ways to do so, e.g. the tamper proof features in smart cards or cryptographic processors. There are multiple such tamper proof measures capable of meeting FIPS-140 levels 1, 2, 3, or 4 for tamper proof security requirements. In an embodiment, a device 200 can include a physical destruction element such as an electromagnetic device (e.g. magnetic field generator, high-intensity RF device), chemical device (e.g. destructive chemical compound such as an acid, very small explosive charge, or other incendiary device), or a non-chemical and non-electromagnetic module that is able to permanently render the device or data stored thereon inoperable when tampering is detected, if policy dictates that the device should self-destruct (e.g. outside of destruction time interval, device detects that there is an unauthorized user), and/or a server commands the device to self-destruct.

Alternatively or in addition, the behavior modification module 206 can notify a server 111 that the key device 210 has not been detected within the specified time period, and the server 111 can revoke the target device's credentials. Alternatively, when the target device 200 is the server and the user's key device 210 has not been detected within the specified time period, the server can revoke access directly, e.g. disabling the user' account or changing the user's password, or indirectly by communicating with an authentication server, a LDAP server, or a single sign on provider to disable the user's access.

Figure 3:
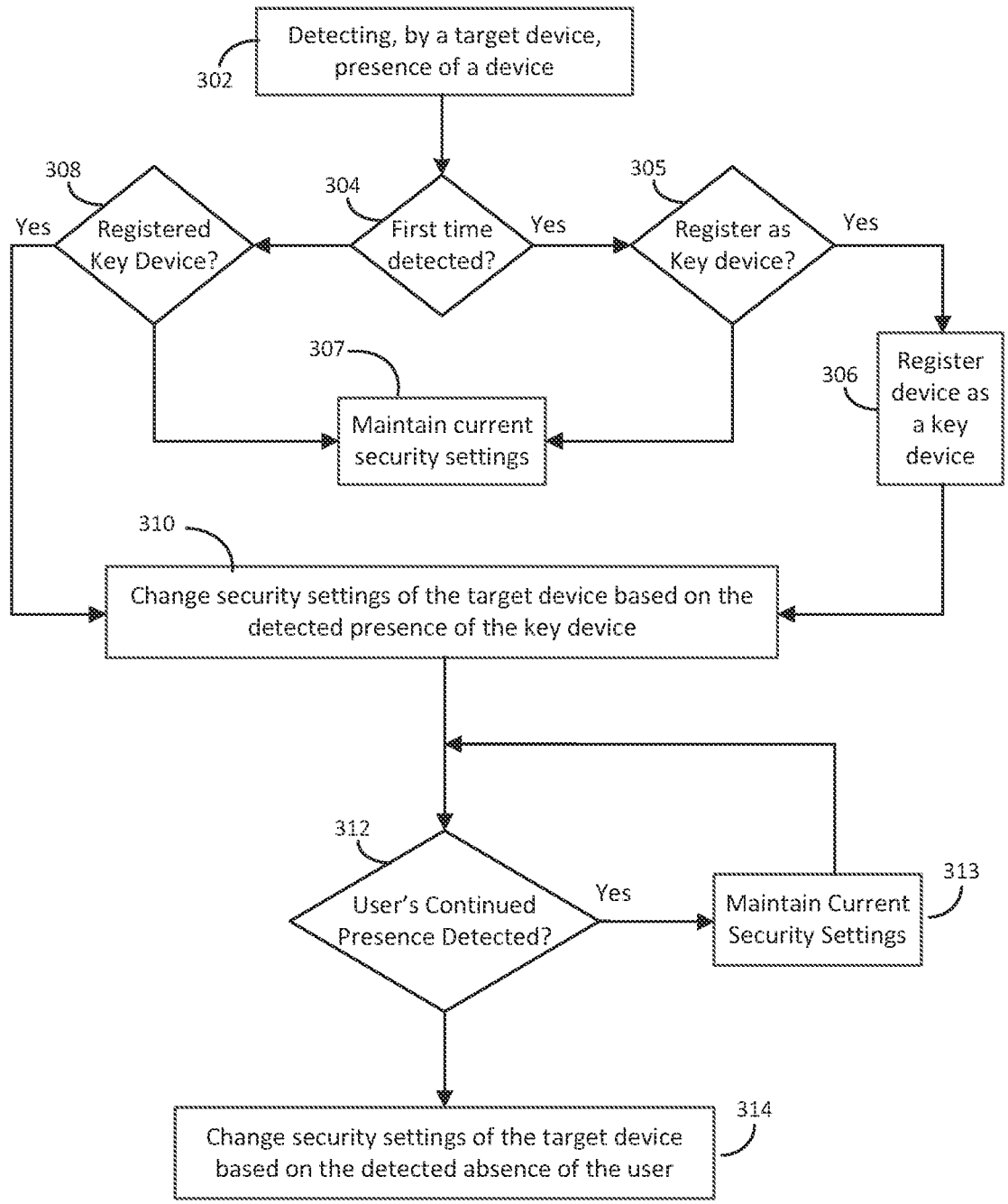
FIG. 3 is an operational flow diagram illustrating a high-level overview of a method of the invention according to an embodiment.

FIG. 3 is an operational flow diagram illustrating a high-level overview of a method changing security behavior of a device based on proximity to another device, such as a key device, according to an embodiment. In block 302, the target device 200 detects the presence of another device, which can be any of the client devices 140a-140e illustrated in FIG. 1 or a dedicated device. As indicated above, the presence of the other device can be detected via BLUETOOTH or NFC, or other means. When the presence of the other device is detected, the target device 200 can determine whether the other device is being detected for the first time in block 304. When such is the case, the target device 200 can prompt a user 110 to indicate whether the other device should be a key device 210 in block 305. When the user 110 indicates affirmatively, the target device 200 can be configured to register the device as a key device 210 in block 306. Otherwise, the device is not registered, and the security settings of the target device 200 remain unchanged in block 307.

Alternatively, when the other device has been detected previously (block 304), the target device 200 can determine whether the detected device is a previously registered key device 210 in block 308. When such is not the case, the security settings of the target device 200 remain unchanged in block 307. According to an embodiment, when the detected device is either a previously or newly registered key device 210, the security settings of the target device 200 are changed based on the detected presence of the key device 210 in block 310.

According to an embodiment, once the key device 210 is detected, the target device 200 is configured to detect the user's continued presence in block 312. While the user 110 is present, the current security settings of the target device 200 are maintained in block 313. When the user's presence is no longer detected in block 312, the security settings of the target device 200 are changed based on the detected absence of the user 110 in block 314.

An Example Embodiment

In an example embodiment, a user Alice awakes in the morning when Alice's iPhone alarm goes off Alice presses its Touch ID fingerprint identity sensor, which authenticates her to the iPhone device. The security system component of this disclosure determines that the iPhone was in fact configured to have the Touch ID capability turned on, and that Alice has verified her identity to the iPhone, thus Alice is in possession of the iPhone. Alice dresses in her workout outfit, places her iPhone in the pocket of her sweatpants, and walks to the exercise room in her apartment complex for her morning workout. A normal iPhone would, during the period of inactivity during Alice's walk to the exercise room, engage its locking function, but because the security system component on the iPhone is operating, it observes using the motion sensors on the iPhone and a motion classification technique and optionally readings from a device proximity sensor (which detects whether there is an object within a few cm of the sensor) that the iPhone was placed in a pocket, and determines that during the entire duration of Alice's walk to the exercise room there has been motion sensor output indicating that Alice is walking, and that therefore Alice has been in possession and control of the device the entire time, and prevents the timeout autolock from engaging.

Alice arrives at the exercise room, places her fitness band monitoring device on her wrist, removes her iPhone from her pocket and places it on a table in a corner of the room, and walks to the other side of the room to begin her workout on the rowing machine. The security system component detects the fitness band being turned on and pairs with it using Bluetooth. Because the fitness band is in acceptable proximity with the iPhone as determined by the security system component, the component notes that the fitness band is in Alice's possession. The security system component determines from the physiological sensors (measuring Alice's pulse) began to record Alice's pulse rate when she put it on her wrist. The security system component thereby notes that Alice was wearing and in possession of the fitness band. The security system component determines from classification of motion sensor outputs on the iPhone that the phone was set down on a surface, after which there were no further motion sensor inputs to the iPhone. The iPhone is still in acceptable proximity to Alice as determined by the fact that there is still an acceptably strong Bluetooth connection between the iPhone and the fitness band, and determines that Alice is still in possession of the iPhone even though it was set down on a flat surface. As Alice walks to the other side of the room, the Bluetooth connection weakens and the security system component determines that the two devices, the iPhone and the fitness band, are no longer in acceptable proximity. Because there is also no evidence that Alice is present at the iPhone and in possession of the iPhone device, the security system component notes that the iPhone no longer has Alice in possession of the device, and changes security settings on the iPhone to lock the phone. The security sensor may also arm a movement alarm on the iPhone to prevent an unauthorized person from picking it up.

Alice completes her vigorous 45 minute exercise routine, during which time the fitness band has been monitoring her pulse rate continuously and recording it. Alice walks back to the opposite corner of the room where she had set down her iPhone, picks it up, and begins to use it. As Alice neared the corner of the room where the iPhone had been placed, the iPhone and the fitness band reconnected their Bluetooth connection. The security system component observed the reconnection, and determined that the fitness band was now in acceptable proximity to the iPhone. But is it Alice who has brought the fitness band to the corner of the room where the iPhone is? The security system component queries the fitness band interface and obtains the continuous pulse record that had begun when Alice was originally in acceptable proximity to the iPhone. The security system determines that Alice was in continuous possession of the fitness band during her time away from the iPhone, and therefore this is Alice. In response, the security system component changes security settings and unlocks the iPhone.

Alice puts her iPhone into her pocket, returns to her apartment, enters her home office and turns on her PC. It boots and unlocks. The PC after booting pairs with her iPhone using Bluetooth. The system security component on the iPhone communicates with the system security component on the PC to determine that Alice is authenticated to the iPhone and is in possession of the device. The security component on the PC unlocks the PC because Alice is proved to be authenticated and acceptably proximate. Alice turns her iPhone off and connects it to a charger, and opens a browser to connect to her email account. Alice is automatically logged in and reads her email. The security component on the PC communicates with a password manager component on the PC to indicate that Alice is authenticated and present; the password manager component automatically logs Alice in to the email system. Alice reads an article that reminds her about a book that is on a shelf on the other side of her home office. Alice gets up, walks to the shelf, and returns to her PC, which is still unlocked. The security component on the PC has previously, using the PC camera, observed a person (who has been inferred to be Alice) sitting in front of the PC. The motion tracking software connected to the camera observes that the person (Alice) leaves the chair in front of the PC, but remains in view as Alice walks away to the other side of the office space. The PC screen dims, and optionally locks, because Alice is no longer in front of and thus in acceptable possession of the PC device. The security component of the PC, using the motion tracking software connected to the camera on the PC, determines that Alice has returned to a position in front of the PC, and is once again in acceptable proximity to the PC. Because the motion tracking of Alice was continuous, the security system component knows that the person in front of the PC is in fact authenticated Alice, and thereby in response unlocks the PC.

The above exemplary embodiment was presented for the purposes of exposition to provide a scenario context for understanding the following discussion of the various parts of the system.

Figure 4:
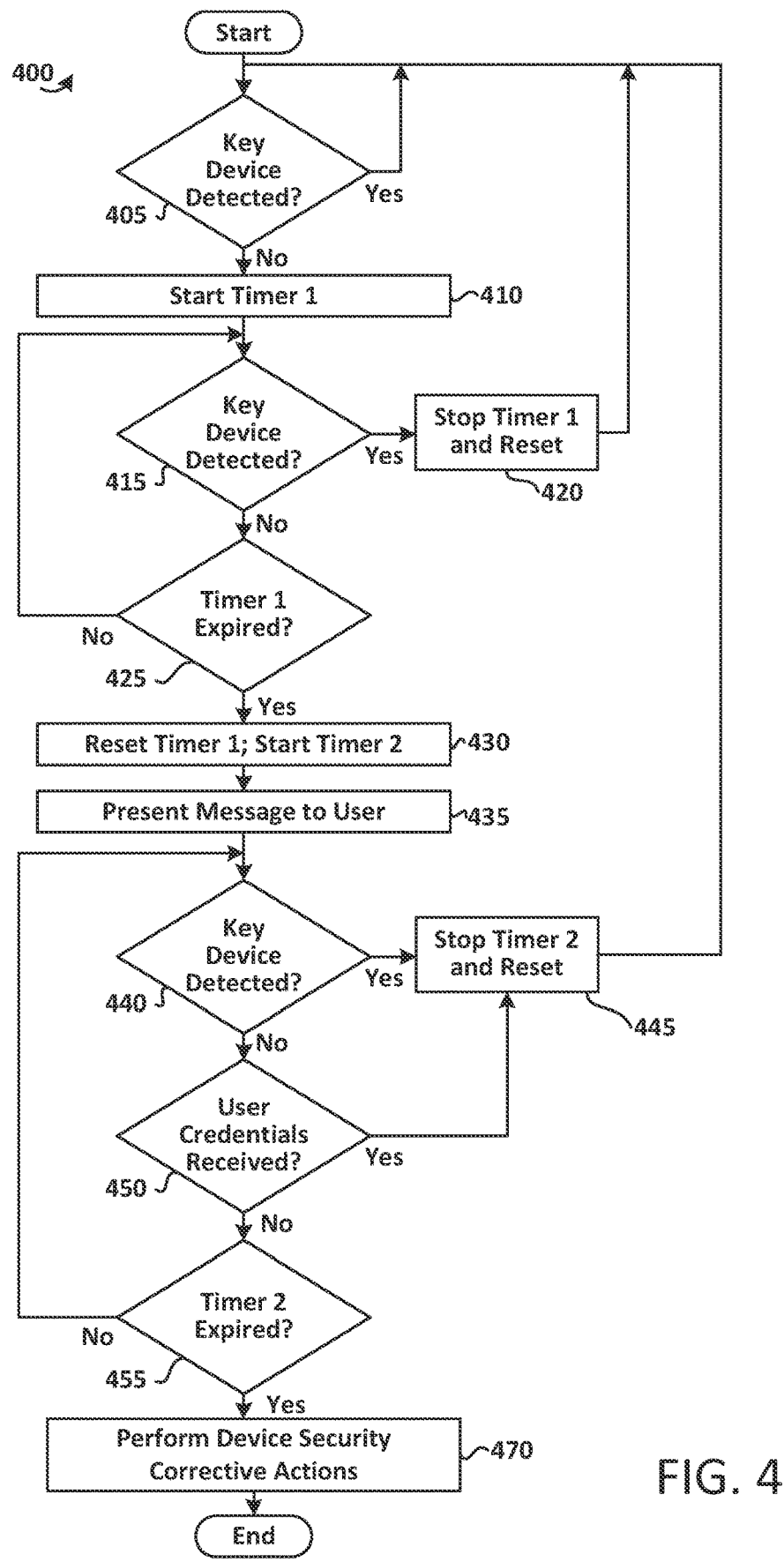
FIG. 4 is an operational flow diagram illustrating a high-level overview of a method of the invention according to another embodiment.

FIG. 4 is an operational flow diagram illustrating a high-level overview of a method for providing an opportunity for a user of the mobile communications device 200 to prevent the mobile communications device 200 (also referred to as the target device) from automatically changing the security settings in the absence of a key device 210, according to another embodiment. In one embodiment, changing the security settings may include automatically performing device security corrective actions on a mobile communications device 200. The device security corrective actions are any actions that can be taken on a device to serve a purpose of improving the security of a device, an application on the device, or services to which the device may connect on a network. For example, device security corrective actions may include, but are not limited to, changing the settings or the state of an application on the mobile communications device 200 or the setting or the state of the mobile communications device 200; blocking or uninstalling an application or keep an application from running on the mobile communications device 200; forcing an update of a version or level of an application on the mobile communications device 200; modifying the behavior of an application on the mobile communications device 200 or the behavior of the mobile communications device 200; wrapping an application on the mobile communications device 200 to modify the behavior of the application; monitoring or modifying network traffic to or from the mobile communications device 200 or an application on the mobile communications device 200; changing the security or risk level of the mobile communications device 200; modifying the security policy on the mobile communications device 200;

reporting a change in security or risk level of the mobile communications device 200 to a computing device associated with an administrator; changing access levels of a user, an application, or a device to a network or server services; requiring additional levels of authentication from the user; or requiring a change in user credentials, i.e., password. The device security corrective actions can be preconfigured in the mobile communications device 200, at a security server, or determined by an administrator.

At step 405, the proximity detection module 204 in the mobile communications device 200 determines whether a key device 210 is present. For example, when a key device 210 enters the mobile communications device's 200 proximity, the mobile communications device 200 can determine that key device 210 is present. If at step 405, the key device 210 is not present, then a first timer, Timer 1, is started at step 410.

At step 415, the mobile communications device 200 again performs a test to determine whether a key device 210 is present after the first timer has started. If at step 415 the key device 210 is present, then the first timer, Timer 1, is stopped and reset at step 420. During this time the mobile communications device continues to monitor for the presence of the key device 210 in step 405.

If at step 415 the key device 210 is not present, then the mobile communications device determines whether the first timer, Timer 1, has expired at step 425. If at step 425 the first timer, Timer 1, has not expired then the mobile communications device makes a further determination as to whether or not the key device 210 is detected at step 415.

If at step 425, the timer, Timer 1, has expired, then at step 430 a second timer, Timer 2 is started and the first timer, Timer 1 is reset. The second timer, Timer 2, is configured to expire after a preset period of time. In one embodiment, the duration of the preset period of time for the second timer, Timer 2 may be different than the duration of the preset period of time for the first timer, Timer 1. In another embodiment, the preset period of time for the first and the second timers may be configured to have the same duration. The first timer, Timer 1, and the second timer, Timer 2, may be implemented in the mobile communications device 200 by a single module that performs the role of both the first timer, Timer 1, and the second timer, Timer 2. The module that implements the timer functionality may be a software module or a hardware module.

At step 430, the mobile communications device provides a notification to the user. In one embodiment, the notification may include a request for user authentication, wherein the user authentication request requires the user to input credential information. In another embodiment, the notification may include, but is not limited to, information indicating one or several of these meanings, such as: the key device 210 is no longer detected; the key device 210 has not been detected for a period of time; the mobile communications device 200 will perform device security corrective actions unless the user enters credentials; the mobile communications device 200 will perform device security corrective actions unless the user enters credentials within a specified period of time; the mobile communications device 200 will perform device security corrective actions unless the user enters credentials before the second timer, Timer 2 expires; and other messages substantially corresponding to the meaning that the user has an opportunity to prevent the mobile communications device 200 from performing device security corrective actions if the user takes specific actions.

The notification to the user in step 435 may be delivered via the display screen 205 of the mobile communications device 200, audible sound from the mobile communications device 200, or by a haptic behavior of the mobile communications device 200. The notification to the user may also be delivered by visual indication on the key device 210, such as controlled illumination of an LED, by an audible sound from the key device 210, by a haptic behavior of the key device 210, or a combination thereof. Many other suitable mechanisms to notify a user in the context of this invention are known to those skilled in the art.

At step 440, the mobile communications device 200 once again determines whether the key device 210 is present. If at step 440 the key device 210 is present, then the second timer, Timer 2, is stopped and reset at step 445. During this time, the mobile communications device 200 continues to monitor for the presence of the key device 210 at step 405.

If at step 440, the key device 210 is not present, then the mobile communications device 200 determines whether the user of the mobile communications device 200 has entered the required credential or taken any alternative required action at step 450. The alternative required action is an action taken by a user that is associated with a security related function, wherein the security related function is any function that is implemented with a security objective. The alternative required action could take many forms, including, but not limited to, putting the mobile communications device 200 into Bluetooth only mode, disabling the GPS receiver, disabling the camera, disabling the microphone, disabling specific communication protocols, deleting files, un-installing one or more applications, removing one or more certificates, suspending execution of an application, terminating execution of an application, and the like. If at step 450 the mobile communications device 200 determines that user of the mobile communications device 200 has entered the required credential or taken the alternative required action, then the second timer, Timer 2, is stopped and reset at step 445 and the mobile communications device 200 continues to monitor for the presence of the key device 210 in step 405.

If at step 450 the mobile communications device 200 determines that user of the mobile communications device 200 has not entered the required credential or taken the alternative required action, then the mobile communications device 200 determines whether the second timer, Timer 2, has expired at step 455. If at step 455, the second timer, Timer 2, has not expired then the mobile communications device 200 makes a further determination of whether or not the key device 210 is detected in step 440.

If at step 455 the second timer, Timer 2, has expired then the mobile communications device 200 performs device security corrective actions at step 470. In this embodiment, the device security corrective actions are performed based on a user's action or lack of action when a key device 210 is not in the proximity of the mobile communications device 200.

Figure 5:
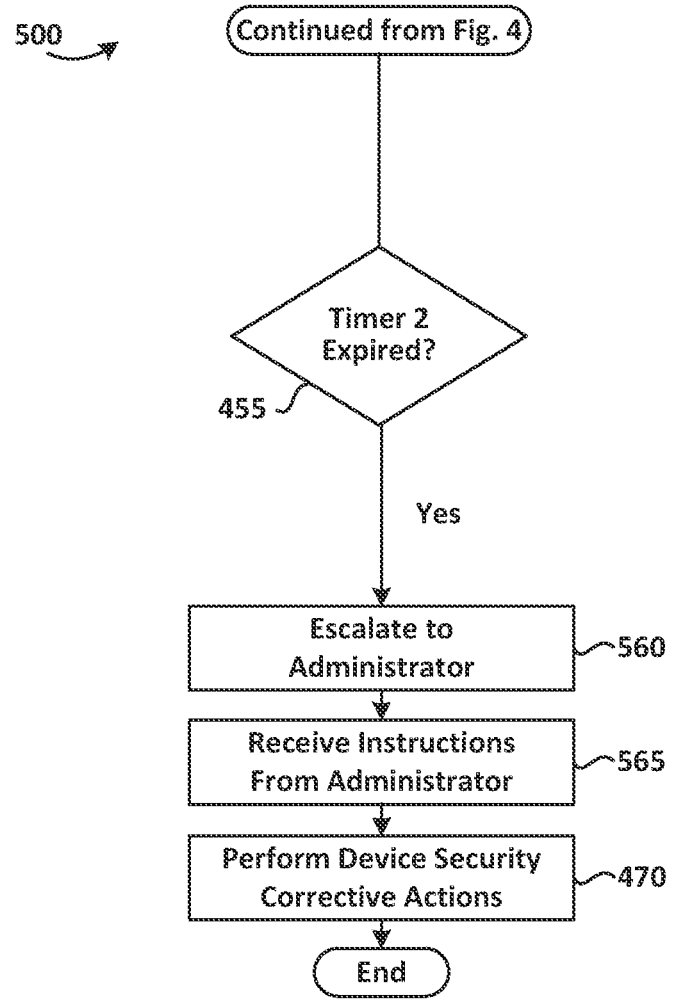
FIG. 5 is an operational flow diagram illustrating a high-level overview of a method of the invention according to another embodiment.

FIG. 5 is another operational flow diagram illustrating a high-level overview of a method for providing an opportunity for a user of the mobile communications device 200 or an administrator to prevent the mobile communications device 200 from automatically changing the security settings in the absence of the key device 210, according to another embodiment.

In this embodiment, prior to performing the device security corrective action as described above and illustrated in step 470 in FIG. 4, an administrator may be sent a notification and may prevent the mobile device from automatically performing the device security corrective actions.

At step 455, as described above with reference to FIG. 4, when the second timer, Timer 2, has not expired, the mobile communications device 200 makes a further determination of whether or not the key device 210 is detected at step 440. If at step 455 the second timer, Timer 2, has expired then the mobile communications device 200 facilitates the notification of an administrator by sending a message to a computing device associated with an administrator in step 560. Alternatively, a message may be sent to a server that is accessible from the computing device associated with the administrator. In one embodiment, the computing device associated with the administrator may include an administrator console which could be an MDM or cloud-based identity provider (e.g., a CASB (Cloud Access Security Broker) or AZURE ACTIVE DIRECTORY). The notification conveys the meaning that the key device 210 is no longer present and that the user has not intervened to prevent the mobile communications device 200 from performing device security corrective actions, which might mean that the mobile communications device 200 is no longer in the control of the authorized user of the mobile communications device 200.

In step 565, the mobile communications device 200 receives instructions from the administrator. The instructions may instruct the mobile communications device 200 to proceed to take pre-determined device security corrective action or may specify particular device security corrective actions. Following step 565, the mobile communications device 200 performs device security corrective actions at step 470. In this embodiment, the device security corrective actions are performed based on an administrator's actions when a key device 210 is not in the proximity of the mobile communications device 200. In an embodiment, the mobile communications device 200 performs device security corrective actions at step 470 without receiving instructions from an administrator.

Proximity

According to an embodiment, a system for performing authentication or authorization operations or modifying a device's security or operational settings using in part the proximity of two or more objects is provided. In this embodiment, an acceptable proximity of two objects is determined, where the objects are electronic devices or active or passive physical tokens or a person's actual body or body parts. Electronic devices include such things as smartphones, tablets, PCs, servers, authentication tokens, smartcards, electronic devices worn by, implanted in, or carried by a person, such as smart watches, head mounted or worn glasses or other devices such as brain wave monitors, fitness bands or medical devices monitoring a person's physiological state such as pulse, circulation oxygen levels, electrocardiogram, respiration rate, perspiration activity, skin conductance, pupil dilation, gaze direction, and so on. Such objects may have computer processing capabilities or not, and may have communications capabilities or not. Acceptable proximity is a physical distance between the two objects that is less than a predefined threshold distance; or a physical distance between the two objects that is less than a predefined threshold distance combined with a relative orientation of the two objects; or a physical distance between the two objects that is less than a predefined threshold distance combined with a detection of whether there are intervening objects or not (such as wall or display monitor); or is a network distance such as two devices being connected to the same segment of a LAN or being connected to the same device via a wireless communication mechanism (said wireless communication mechanism may involve RF-based communications such as Wi-Fi or Bluetooth or NFC, or light-based communications such as infrared or laser communication or Light Field Communication (LFC) or sound-based communications such as modulated sound transmitted through the air or as vibrations in a solid object like a desk or work surface); or being connected by a wire used for communication.

It is important to note that the use herein of the term "proximity" is not the same meaning as a "proximity sensor" in a mobile device. A proximity sensor, for example, in a smartphone, is intended primarily to determine if an object, usually the user's head, is within a small distance from the device, and is intended to prevent accidental touch events, such as the user's ear or cheek touching the touch sensitive display surface, from triggering actions on the device. Typically, such a proximity sensor determines if there is some object within 2-5 cm. of the sensor. Often such a sensor only reports a state of "close/near" or "far." The use of proximity within this application deals with a large range of potential distances, not just a few centimeters, but also meters or tens or hundreds of meters or even kilometers, and the concept of proximity, particularly what will be described as acceptable proximity, is more complex.

In an embodiment proximity is determined by a range finding operation. A range finding sensor is used to measure a physical distance from the sensor to a target. One example of a range finding sensor includes LIDAR (light detection and ranging), in which light, often from a laser, is used to illuminate a target and analyzes the reflected light. Time of flight and/or interferometric measurements are used to determine distance from the sensor to the target. Another example of a range finding sensor includes a SONAR (sound navigation and ranging) system, in which sound is emitted from the sensor and reflected by the target back to the sensor. A SONAR sensor may often use ultrasonic sound. Time of flight is used to determine distance from the sensor to the target. Another example of a range finding sensor includes RADAR (radio navigation and ranging), which uses RF (radio frequency) emissions which are reflected from a target and the time of flight is used to determine distance from the sensor to the target. Another example of a range finder sensor is a CCD array based IR (infrared) sensor, which uses a directional pulse or beam of IR light which is reflected by a target, and the angle of reflection arrival is measured by the CCD array to determine by triangulation the distance to the target. Another example of a range finding sensor is the Microsoft Kinect sensor, which combines a depth sensor employing structured light (a known pattern of light) emission and a camera to determine the distance from the sensor to a particular target. Another example of a range finding sensor is a photogrammetry or stereophotogrammetry system, which uses computer vision techniques to determine the relative position and distance of a target object from the sensor. Another example of a range finding sensor is a motion tracker (also referred to as motion capture or performance capture systems) such as Ascension's Flock of Birds device; such sensor systems determine distance and position of a target relative to the sensor, using various technologies such as active markers which emit light or sound that is tracked by a camera or directional microphone; or passive markers which are observed by computer vision systems and triangulation or measurement relative to known distance objects is used to determine distance to a target; or magnetic systems which calculate position and orientation and thus distance using the relative magnetic flux of magnetic coils on a transmitter in the sensor and in the target. In an embodiment, not just distance but also orientation is determined. Another example of a range finding system is one that measures distance using a measurement of the time of flight of a signal between two objects; the signal could be a radiofrequency signal, or an audio signal (ultrasonic or subsonic or in normal audible range of about 20 Hz to 20,000 Hz) propagated through air or as a vibration through a solid object such as a desk or work surface, or a visible light signal, or other electromagnetic signal. Time of flight is measured for the transmission of the signal from one object to another, with a synchronized time between the two objects used to measure the elapsed time of flight, which with the known speed of signal transmission determines the distance between the two objects. In this embodiment, one object has a signal emitter and the other object has a signal receiver, and both objects have the ability to communicate either the system that determines the proximity distance, said system which resides within one or the other objects, or within a separate device, server, or appliance. The usual methods of time synchronization known in the art are used to synchronize time measurements between the two systems. In another embodiment, time of flight is measured using a round trip of a signal transmitted from a first object to a second object, and then reflected from the second object back to the first object.

In an embodiment, a range finding operation is performed by a third device to measure the distance to two other objects, a first target and a second target, in order to determine an estimate of the distance between the two other objects. In the absence of any orientation or other location specific information from a range finding, and with only a pair of distances $(D_1, D_2)$ to the first target and second target, respectively, the system concludes that the proximate distance $D_P$ between the first and second target is in the range of distances $[\max(D_1, D_2) - \min(D_1, D_2), D_1 + D_2]$. The minimum range value occurs when the two targets are collinear with the range finding sensor and are on the same side of the sensor. The maximum range value occurs when the two targets are collinear with the range finding sensor and are on opposite sides of the sensor. For a range finding sensor which only observes and measures ranges for objects within an angular range of $[-A_S, +A_S]$ from the normal vector for the sensor, where typically AS is less than 90 degrees and is often between 45 degrees and 60 degrees, the upper bound on the estimated range of distances is further constrained. In this case, the maximum range value occurs when the two objects are on opposite boundaries of the angular envelope of sensing range of the sensor, and is $\sqrt{(D_2 \sin A_S + D_1 \sin A_S)^2 + (D_2 \cos A_S - D_1 \cos A_S)^2}$. Some range finding operations may provide not just the pair of distances to two objects $(D_1, D_2)$, but also the orientation from the sensor to the two objects $(A_1, A_2)$, where $A_1$ is an angle from a reference vector, usually the vector in which the sensor is aimed or the vector normal to the sensing plane of the sensor. In such a case the system concludes that the proximate distance $D_P$ between the first and second target is calculated in the usual manner as $D_P = \sqrt{(D_2 \sin A_2 - D_1 \sin A_1)^2 + (D_2 \cos A_2 - D_1 \cos A_1)^2}$ In an embodiment, a range finding operation is performed by two devices to measure the distance between the same two devices, a first target and a second target, by correlation of signals ambient in the environment of the two devices. Signals in the environment can be sounds that are subsonic, or in the normal human hearing range of 20 Hz to 20,000 Hz, or ultrasonic, or are transmitted in air as vibrations in solid objects such as a desk or workstation or vehicle chassis, frame, or objects connected to them; or can be light emissions that are in the visible light range, or nearby (infrared or ultraviolet), or other electromagnetic emissions including radiofrequency (RF) emissions (such as two devices being able to detect the same SSID or BSSID of a Wi-Fi access point or the same cellular transmission tower) or modulated magnetic fields. The signals in the environment may be signals that are being deliberately emitted by other objects or persons in the environment, as in background noises, engine noises, music being played, etc., or may be signals that are being emitted by a part of the system to facilitate a range finding operation. In an embodiment, a first target and a second target both receive signals from the ambient environment. A system determines the best correlation between the signals to determine how much time difference exists between the two signals as received. The system uses the time difference of the two correlated signals and the a priori known speed of transmission of the signal in the transmission medium to determine a lower bound estimate of the distance between the two targets, as in $r_{measured} = t_{delta} * v_S$, where r is the distance measurement, $t_{data}$ is the time difference of the two correlated signals as received, and $v_S$ is the speed of signal transmission in the ambient medium, and $r_{measured}$ is the resultant computed distance. That is, the two devices are known to be no closer than the distance determined in such a measurement, $r_{measured}$, but the two devices could be further away from each other if they are, for example, the same distance away from the emitter of the signal but in opposite directions. An upper bound on the distance between the two devices can be determined to be twice the distance at which a signal of the type received can be transmitted (twice, because the two devices could be on opposite sides of the signal emitter. In an embodiment, the system can estimate an upper bound on the distance between the two devices using a priori known information regarding the maximum distance at which a signal of the type received can actually be received, $r_{max}$. This distance may be based solely upon the transmission characteristics of the signal through its transmission media, or can be also based on information about the local geometry of the environment in which the signal is being transmitted. For example, if the signal is an audio signal and it is known that the environment is a rectangular room that is 12 m by 5 m in dimensions, and that the audio signal would not be able to be detected outside the room, then the maximum distance at which the signal could be received is along the diagonal of 13 m. In the unconstrained case (no knowledge of the geometry of the environment) the system can estimate that two devices are no further apart than $2r_{max}$ (which would be the case if they were located collinearly with the signal emitter and were on opposite sides of the emitter). In the constrained case (known geometry of the 5 m by 12 m rectangular room) the system can estimate that the two devices are no further apart than 13 m.

In another embodiment, the system uses the measured strength of the signal received to estimate the distances between the devices. If the first device measures a signal strength $S_1$ and the second device measures a signal strength $S_2$, then the system, knowing that signal strength of transmissions goes down as one over the square of the distance of transmission from the signal emitter to the receiving device ($r_1$ and $r_2$, respectively), can determine a relationship between these two distances as $$r_2 = r_1 \sqrt{\frac{S_1}{S_2}}.$$

Depending on the relative position of the two devices, ranging from collinear with the signal emitter and on the same side of the signal emitter, or up to collinear with the signal emitter and on the opposite side of the signal emitter, the system can estimate the proximity distance between the two devices as being in the range [abs($r_2-r_1$), $r_2+r_1$], where abs( ) is the absolute value function. In an embodiment, the signal used for correlation or signal strength measurement is not a signal emitted by some other object or person in the environment, but is emitted by the first device. In such a case the distance between the two devices is determined more precisely to be exactly $r_{measured}$ as discussed above, when time difference of best signal correlation is used, or using signal strength measurement, the system uses the well-known in the art free-space path loss formula $$FSPL = \left(\frac{4\pi d}{\lambda}\right)^2$$

and the known initial signal strength and the received signal strength and the wavelength $\lambda$ of the signal to determine the distance d from the signal emitter to the receiving device. In an embodiment, the system involves the first target sending, via a communications channel, a copy of the received signal to the second target, which performs the correlation operation and distance determination. In another embodiment, both targets send a copy of the received signal to a third device, which performs the correlation operation and distance determination.

In an embodiment proximity is determined by a location differencing operation. A physical location $L_1$ is determined for a first target and a physical location $L_2$ is determined for a second target, where a location $L_1$ is a two-dimensional vector (x,y) or a three-dimensional vector (x,y,z), describing the location in the plane or in three-dimensional space. The system calculates the distance between the first and second targets with the usual vector distance calculation $D_P=|L_2-L_1|$. The location coordinates are relative to the location sensor itself, or to some other external frame of reference, such as latitude or longitude. A location may be determined by an object itself, e.g., the first target may have a GPS sensor and can determine its absolute location in latitude and longitude. A location may be determined by a sensor that is part of a system separate from either the first target or the second target, e.g., a computer vision system or a range finding system with orientation detection capability that determines the relative location of the target with respect to the sensor system, which when combined with the known location of the sensor system itself yields an absolute location.

In an embodiment locations used for location differencing are determined by a positioning grid system or a collection of beacons with known locations. Estimates of proximity distance for the first and second target are made using the locations of the nearest grid points to the objects or the known locations of the beacons closest to the device. Examples of this type of proximity determination system include the use of cell towers to determine the cell tower with the location closest to the target based on measured signal strength or time of flight measurements or to more precisely determine locations using well known triangulation methods involving multiple cell towers; or the system from Philips, Inc. which uses connected in-store LED lighting fixtures as known location beacons, each of which emits a different modulated light signal which is detected by a sensor on an object to determine the closest such beacon.

In an embodiment, a system may determine physical proximity by inference from a first device being connected by a wire, cable, optical fiber or other communications connection to a second device. For example, when a smartphone is plugged into a PC using a connecting communications cable, the system may infer a physical proximity of the smartphone to the PC. A more exact distance may be determined by measurement of the transmission time for a signal sent in a single direction or a measured round trip by reflection or retransmission and the a priori known speed of propagation of the signal in the material of the connector.

In an embodiment, a system may determine proximity of two devices via correlation of motion sensors in the two devices, e.g., accelerometer or gyroscope sensors, or changes of values from location sensors such using GPS or cell tower or Wi-Fi signals, or combinations thereof. Motion sensors are increasingly common in devices such as smartphones, tablets, fitness or health monitoring devices, smart watches, or other worn peripheral devices. Movement detected by motion sensors can be categorized or uncategorized, as is well known in the art. A categorized movement can include not just an indication that the device is stationary or in movement, but can also classify a transportation or activity or movement modality, such as a pedestrian modality (walking, running, moving on stairs, exercising, etc.), or a non-motorized transportation modality (bicycling, roller skating), or a motorized transportation modality (e.g., a bus, a train, a car), or an activity modality such as placing a device into a pocket or holster on a person. An uncategorized movement is one that has a time series of measurements from motion sensors but for which no classification as to modality has been determined. The time series of measurements from the sensors on two devices can be correlated to determine if the two devices are moving together. In particular, correlations of low-frequency components of movement sensor time series data indicate that the two devices are moving together, but may not indicate directly an indication of proximity distance. Additional correlations of high-frequency components of movement sensor time series data provide additional evidence of proximity distance. For instance, two devices which are in the first and last cars of a train will exhibit a correlation of low-frequency components of movement sensor time series data, but are unlikely to have a strong correlation of the high-frequency components of that data (small movements and vibrations due to track irregularities or local vibrations within a car will be unlikely to be similar in different train cars); if there is additionally a correlation of the high-frequency components, then the two devices are closer together. For categorized movements, the modality of movement determined by a classifier defines some external constraints for proximity distance ranges. For example, if a movement modality is determined to be a pedestrian modality, then by inference two devices which have a high correlation of movement data are constrained to being carried by, worn by, or implanted in the same human body, and thus are at most 2 m apart. If a movement modality is determined to be a train modality, and there is a correlation of high-frequency components indicating that the two devices are in the same train car, then by inference using a priori knowledge regarding the size of train cars the system can determine that the two devices are at most 21 to 26 m apart, the normal maximum dimension of train cars. If a movement modality is determined to be a motorized automobile, then the system can infer that the two devices with correlation motion are at most 3 to 7 m apart (the relative maximum dimensions of the interior passenger compartments of a four-seater automobile up to a 15 passenger van).

In an embodiment, a system may determine proximity of two devices using information about active communications networks to which the two devices are connected. In an embodiment, there are two devices, the two devices being connected to the same segment of a LAN or being connected to the same device via a non-wired communication mechanism (said non-wired communication mechanism may involve RF-based communications such as Wi-Fi or Bluetooth or NFC or optical wireless Li-Fi).

Multiple methods for proximity measurement may be used. The multiple methods can be used to narrow estimated ranges for proximity, using the maximum of estimated lower bounds on proximity distance and the minimum of estimated upper bounds on proximity distance between to objects.

It should be understood that these proximity measurement methods described above are exemplary and that any other method for determining distance, location, proximity can be used to accomplish the proximity measurement operations of the system.

Acceptable Proximity Using Range, Region, and Orientation

In an embodiment, a system determines a proximity distance between two objects and determines whether the distance is in an acceptable range or acceptable region or acceptable orientation. An acceptable proximity distance range is a threshold for a proximity distance, e.g., a proximity distance that is less than a threshold of three meters. An acceptable proximity distance range can also have a minimum bound on the distance range; for example, an acceptable proximity distance range could be defined, for example for a particular purpose, as being within a minimum distance of 0.5 m and a maximum distance of 2 m.

When the system is dealing with a proximity distance measurement which itself a range, for example, proximity distance was determined to be at least 2 m and at most 10 m, the system may operate in a strict or a fuzzy assessment manner for determining acceptable proximity distance. For example, suppose that for a particular purpose the acceptable proximity distance range is from 0m to 7 m. When the system is operating in the strict manner, the system does not consider the proximity distance measurement range of [2 m,10 m] to be acceptably proximate, because there is a possibility that the exact proximity distance is greater than the maximum acceptable proximity distance range of 7 m. When the system is operating in the fuzzy manner (fuzzy as in fuzzy systems theory), the system can assign a fuzzy value (one between 0 and 1) for the assertion that the proximity distance is acceptable. For example, in one embodiment the fuzzy value is determined using the extent of overlap between the measured proximity distance range and the acceptable proximity distance range; using the example above, this is (7 m−2 m)/(10 m−2 m)=0.625.

An acceptable proximity region is a predefined particular area (two-dimensional) or volume (three-dimensional) surrounding or contiguous to or nearby an object; e.g., an acceptable proximity region for an object that is located within an office cubicle can be defined as the region within the office cubicle itself. In this instance, the use of the acceptable region is important so that an object which might have a small proximity distance but which resides in an adjacent cubicle on the other side of a cubicle wall cannot be considered as acceptably proximate. Similarly, on a different scale, another example of an acceptable proximity region for a particular purpose is the interior of house. Only an object with both an acceptable proximity distance and within the interior of the house (the acceptable region) would be considered acceptably proximate, i.e., an object which is only one meter away but which is positioned just outside a window of a house is not in the acceptable region and thus is not considered acceptably proximate. Another example of an acceptable proximity region is the interior of a corporate office location, which may occupy parts of several floors of an office building. Another example of an acceptable proximity region is a geofenced area such as the boundaries of a city.

An acceptable proximity orientation is a range of angular orientations relative to a first object for a second object to be positioned in; an example is a range of orientations from −70 degrees to +70 degrees from the normal to the surface of a display surface or a camera lens—the acceptable orientation is one in which the object is able to view the surface of the display, or is able to be viewed from the camera. In an embodiment, an object may be determined to be acceptably proximate based solely on proximity distance range, or an acceptable proximity region, or an acceptable proximity orientation, or any combination thereof.

In an embodiment, the criteria for what proximity distance or proximity region or proximity orientation is acceptable is contextual. For example, an acceptable proximity region for a particular use in a vehicle may only include the interior region of the car as an acceptable proximity region while when the context is that the vehicle is in motion, or the engine is running, or the vehicle transmission is not in park, but the acceptable proximity region might extend to ten meters from the vehicle in other cases. Or, for another example in a vehicle, an acceptable region may exclude the region of the driver's seat and a surrounding margin of half a meter from the driver's seat, but include the rest of the car interior for a context while the vehicle is in motion, or the engine is running, or the vehicle transmission is not in park, in order to exclude the driver from being authorized to use a device or certain applications on a device while the driver is likely to be driving the vehicle. A further description of contexts is described in U.S. patent application Ser. No. 13/686,028, entitled "System And Method For Developing, Updating, And Using User Device Behavioral Context Models To Modify User, Device, And Application State, Settings And Behavior For Enhanced User Security," now U.S. Pat. No. 8,655,307, filed Nov. 27, 2012, and U.S. patent application Ser. No. 14/092,195, entitled "System And Method For Using Context Models To Control Operation Of A Mobile Communications Device," filed Nov. 27, 2013, which are hereby incorporated by reference.

Acceptable Proximity Detection, Monitoring, and Events

In an embodiment, a system may initially determine whether there is an acceptable proximity between two objects and then may subsequently monitor proximity for a change in acceptable proximity. When a first object, device, or person approaches a second device, an initial detection of proximity event takes place in the system. Depending on the configuration of parameters for acceptable proximity for a particular purpose, this initial detection of proximity event may not result in a detection of acceptable proximity event occurring in the system. When the first object, device, or person gets close enough to a second device, a detection of acceptable proximity event takes place in the system. When the first object, device, or person increases distance from a second device sufficiently, or changes its position with respect to an acceptable proximity region or an acceptable proximity orientation a loss of acceptable proximity event takes place in the system. When a first object, device, or person can no longer be detected, as, for example, if a device is powered off and the system's method for proximity distance detection can no longer operate, then a loss of acceptable proximity event takes place in the system.

In an embodiment, the system monitors the proximity of the first object, device, or person in an ongoing basis in order to detect changes in proximity state. The monitoring operation may be continuous, or periodic at substantially regular intervals, or may be triggered by the detection of motion events which indicate that the first object, device, or person has changed position and that therefore there may have been a change in acceptable proximity state. Motion events can be detected by the system using motion sensors on the first object, device, or person, or can be detected using external sensors located on the second device, or another device or appliance in the environment which is in communication with the system.

In another embodiment, the system can, at a later time, interrogate information from a device which provides evidence that a device or object is or has been within acceptable proximity distance.

Presence of a Person and Control of a Device by a Person

In an embodiment, a system determines whether a person is present within an acceptable proximity, or whether a person is in possession and by implication in control of an object or device. The system may modify a device's security or operational settings or perform authentication or authorization operations using in part the person presence information. The establishment of the presence of a person is not the same as, and is independent of, authentication and authorization issues. That is, the system may establish that a person (perhaps an unknown or unauthenticated person) is in a proximity region, or is in possession and by inference control of a particular device. But the determination of a person's presence in proximity to a device or possession of a device is used in combination with other authentication and authorization activities to enable the system make determinations or inferences regarding modifying a device's security or operational settings. There are many techniques and methods for establishing that a person is in possession of a device.

In an embodiment, a device that affords interaction, e.g., via a touch screen or hardware controls or a keyboard or other forms of human input devices, can detect that an interaction is occurring and thereby establish that a person is performing the interaction, and therefore a person is present and in possession of that device.

In an embodiment, a device which has motion sensors can detect that the device is in motion, and in particular, is in a classified movement modality such as a pedestrian modality of movement (walking, running, exercising, etc.) or a human-driven non-motorized modality of movement (bicycling, skateboarding, etc.), and thereby establish that a person is present and causing the motion and therefore a person is in possession of that device. The system may also have classification for activities which are not traditionally considered movements, but which nonetheless involve patterns of activity in motion sensors (accelerometers, gyroscopes, etc.) which are recognizable. When a device is worn by a person, or carried in the person's clothing, as in a pocket, or carried in an external container such as a purse or backpack, or is implanted in or otherwise inside a person (e.g., having been swallowed), then the system on the device can detect and classify other activities which demonstrate user presence and possession of the device. For example, the system can classify the types of sensor readings that are associated with a person sitting in chair at a workstation. Typically, a person is not completely frozen or immobile in such a situation, rather there are small posture shifting motions, or vibrations detectable due to manual interaction with objects in the environment (e.g., picking up a coffee cup, writing with a pencil on a paper, typing at a keyboard, moving the hand or arm to use a touchscreen on some other device, scratching an itch, etc.). In the same manner that the system uses classification means for determining larger scale movement modalities the system uses classifiers on sensor data to establish other activity modalities, such as in the example above, sitting in a chair. Similarly, a person who is standing in place is not completely motionless, there are small posture shifts, balance correction movements, articulated movement of the person's limbs, movements of the head, and so on which generate motion sensor readings that enable the system to classify the activity as a person standing. As previously described, such motion and activity classification techniques are well known in the art.

In an embodiment, a device, in particular, a device which is carried by, worn by, or implanted or otherwise inside or affixed to a person has biometric sensors which indicate that the device is in possession of a person. For example, a fitness band or smart watch or smart glasses or medical monitor may have sensors which can detect the presence of a person's pulse or electrocardiogram or brainwaves or body temperature or blood circulation or eye movement or blinking or other biological indicators that a person is present and in possession of the device.

In an embodiment, a device may have a camera which can detect via computer vision techniques that a person or a person part (such as a face or a hand) is in the view of the camera that is part of or attached to the device. The computer vision recognition of a person, or a part of person (which by ordinary implication is attached to a person) is used by the system to establish that a person is present, and by implication in possession of the device.

In an embodiment, an external system that can detect the presence of a person in a location or an area is in communication with the system to establish the presence of a person, and using information about the relative location of the person and of a device, determines that when the person is present within an acceptable proximity of the device that therefore by implication the person is in possession of the device. For example, a motion detection system using computer vision techniques or infrared and motion detection (such as are used for home security systems) establishes that a person is present and in a particular location; a device is known by the proximity, presence, authentication, authorization and control system to be in an acceptable proximity to the location of that person. The system determines that therefore the person is in possession of that device.

In an embodiment, an audio sensor or microphone is used by the system to receive audio signals which indicate that a person is present. For example, the noises made by a person while walking, writing, breathing, or performing other activities can be detected and classified using well known means as activities which represent a human presence. In another embodiment, the audio sensor or microphone can detect an audio signal as being a human voice and therefore evidence of a human presence.

It should be understood that any of the presence and possession detection techniques may deliver exact (yes, no) results, or may deliver results with an uncertainty, as for example is done with fuzzy systems, where a fuzzy value in the range 0 (not present or not in possession) to 1 (absolutely present or absolutely in possession) is returned. Operations by the system that combine results or perform inferences can use fuzzy logic for combining fuzzy values, as is commonly done in the art for fuzzy control systems.

It should be understood that these presence and possession measurement methods described above are exemplary and that any other method for determining the presence of a person or the possession of a device or object by a person can be used to accomplish the presence and possession measurement operations of the system.

Acceptable Presence and Possession Monitoring and Events

In an embodiment, a system may initially determine whether there is a presence of a person or of a person in possession of a device and then may subsequently monitor presence and possession related information for a change in acceptable presence and acceptable possession.

In an embodiment, the system, having initially determined that a person is in possession of a device, may have a time out period configured such that, if there is no new or confirming evidence of possession of the device by the person during the time out period, the system determines that it can no longer confidently conclude that the person is in possession of the device, and thus concludes that the person is not in fact in possession of the device any longer.

In an embodiment, the system, having initially determined that a person is in possession of a device, may use motion and activity event classification techniques to determine that the person has placed the device into a part of the clothing worn by a person, for example, the person placing a smartphone device into the person's shirt or pants pocket. The system determines that, barring other classified motion or activity events which indicate that the device is being removed from the pocket, that the person is and continues to be in possession of the device. In this example, even if the person were to place a smartphone device into the person's pants pocket, and then lie motionless upon the floor for a period of time, the system will ignore any configured time out period, and will continue to maintain the determination that the person is in possession of the device.

In an embodiment the system, having initially determined that a person is in possession of a device, may use motion and activity event classification techniques to determine that the person has placed the device into the person's body, for example, by the person swallowing a smart pill device, or the person placing a smart hearing aid device into the person's auditory canal, or the person placing a smart contact lens device onto the cornea of the person's eye, or the surgical implantation or subcutaneous injection or topical skin application of a smart medical device (such as a pain pump, insulin pump, cardiac pacemaker, implantable cardioverter defibrillator, orthopedic strain gauge sensor device, injectable glucose sensor, injectable RFID or NFC chip, injectable or implantable EEDDs (Electronically Enabled [drug] Delivery Devices), smart tattoo, brain or neural implant (for epilepsy control or brain-computer interfaces (BCIs) or deep brain or nerve stimulation or sensory substitution or brain pacemaker, e-skin sensor device, bionic eye or organ replacement device or muscle or joint augmentation device, transcranial direct-current stimulation (tDCS) device, transcranial magnetic stimulation (TMS) device, etc.). The system determines that, barring other classified motion or activity events which indicate that the device is being removed its position in or on the body, that the person is and continues to be in possession of the device. In this example, even if the person were to place a smart contact lens onto the person's cornea, and then lie motionless upon a bed for a period of time, the system will ignore any configured time out period, and will continue to maintain the determination that the person is in possession of the device.

In an embodiment, the system, having initially determined that a person is in possession of a device, may use motion and activity event classification techniques to determine that the person has surrendered possession of the device. For example, a person may set a device down upon a stationary surface (e.g., upon a desk) or drop a hand carried device, or have a device in a pocket of apparel slip out and fall, or hand a device to another person, or toss or throw a device. Each of these motion or activity events are classified by the system as of a type which involves the person formerly in possession of the device losing possession of said device. The system determines, based on such an event, that the person is no longer in possession of the device. Other such triggering events are taking off or removing a device that is worn upon the body, such as a smart watch, smart glasses, fitness band, headphones, earbuds, etc.

In an embodiment, the system employs object motion tracking technology (such as computer vision systems or motion trackers) to track the path of a person or device or other object. For example, the system using this technology can determine that a person, who originally was within an acceptable proximity of device, has moved away from to a distance that is not acceptably proximate, and then has subsequently moved close enough to the device to once again be acceptably proximate. The information from the motion tracking system allows the security system to determine that this is in fact the same person or device or object from the earlier time.

User Authentication

In an embodiment, the system performs an authentication step of a user. In such a step, according to methods well known in the art, the user can provide something that the user knows (for example, a PIN or password or answer to a secret question), or something that the use is (for example, a biometric such as a fingerprint, or a retinal scan, or a DNA sample or a characteristic electrocardiogram, or a characteristic brainwave, or the user's face for a facial recognition system, or an observable and unique behavioral trait such as the user's gait while walking or the result of the user creating a signature with a pen), or something that the user has (a key card, a smart card, a device such as a smartphone, an RFID or NFC tag, a physical key that unlocks a physical lock, etc.). The above forms of user authentication are well known in the art, and may be used in combination with each other for a more stringent level of authentication. As will be discussed below, the system described in this application employs user authentication in various combinations with acceptable proximity determination, acceptable person presence and possession, and other factors to extend the realm of what is possible in authentication, authorization, and changing security and operational settings of devices.

In another embodiment, the security system component on a device observes an authentication operation performed by the user of the device. The authentication operation can be an authentication to an app running on the device, or to a component of the operating system or virtual machine on the device, or to a virtual container for apps or data on the device, or to a trusted platform manager on the device, or to a password manager application or component on the device, or to a VPN or other secure network connection facility on a device, or to a webapp or website accessed from the device. The security system component determines whether the observed authentication operation was successful. When the authentication operation was successful, the security system component creates an assertion that the current device user is known to be a specific user (the username that was presented in the successful authentication operation) as authenticated by a particular authenticator (the app or component or service or website which performed the authentication). This assertion is a form of inferred authentication (see the explanation of inferred authentication below) which the security system component can use to present in a future authentication operation with a different device or app or service or website, in the case where that authenticator will accept a third party assertion of identity from this trusted source. In an embodiment, the security system component also records the additional information (other than the username) that was presented in the initial authentication operation; such additional information can be a password, PIN, digital certificate, private key, shared secret, biometric information, or a signed or hashed version of one of these pieces of information. The information so saved is a form of a derived key (discussed below).

Device Authentication

Various authentication processes can utilize various types of data to verify the authenticity of the devices. For example:
- a device can provide an identification number (e.g. MAC address, card identifier, EPC code) explicitly or as part of its communication with the other device
- a device can provide a secret code/key, which is matched a secret code/key in the other device
- mutual certificate verification (e.g. using TLS/SSL) can be performed where both devices can validate the chain of trust of the certificates each supply.
- an encrypted payload can be transmitted from one device to another device having a decryption key (symmetric or asymmetric), and where successful decryption of the payload indicates a knowledge of a shared secret (symmetric key encryption) or a private key (asymmetric key encryption), thereby proving authenticity
- each device can sign and encrypt data using each other's public keys.

Inferred Authentication and Inferred Credentials

In an embodiment, the system uses a combination of user and/or device authentications, and the detection and monitoring of acceptable proximity, the detection and monitoring of acceptable presence and acceptable possession to perform what is called inferred authentication and/or to create what are called inferred credentials. In an embodiment, the system infers from the facts that firstly a user has authenticated to a first device in the past, that secondly the first device is in acceptable proximity to a second device, and that thirdly the first device is considered in acceptable possession of the authenticated user, that therefore the authenticated user can be automatically authenticated to the second device without requiring any action by the authenticated user.

It should be understood that the three elements upon which the inference is made by the system can occur in any order; it is only required that all three elements have been determined in order for the system to make the inference and to in response perform the authentication of the user to the second device.

It is important to distinguish the notion of an implied authentication and an implied credential from that of a derived credential. Derived credential technology constitutes a technique for creating, storing, and presenting a credential based upon a different credential. An inferred authentication is an inference made by the system using information from an earlier user authentication with a credential, and the establishment by particular system-specific techniques that the user is in acceptable possession of the first device previously used to perform the authentication operation, and that the first device is in acceptable proximity to the second device which requires the user to authenticate. The inference made by the system is that the user is present and should be authenticated. A variety of techniques for actually performing the authentication operation to the second device are used in the system.

In an embodiment, the system creates a derived credential based upon the first authentication operation which is in turn used in performing the authentication to the second device. In this embodiment, there does not have to be a component of the security system residing on the second device; the second device sees an acceptable authentication in a manner that it already supports for authentication operations.

In another embodiment the security components of the system running on the first device authenticates itself to the second device using a suitably protected key or secret or by demonstrating cryptographically a proof of knowledge of an authorizing key or secret to the second device; having done so, the now authenticated first device presents an assertion, the inferred authentication, to the security component on the second device, which performs the authentication operation on the second device.

In an embodiment, the system creates a derived credential based upon the first authentication operation which is in turn used in performing the authentication to the second device. Derived credentials are well known in the art, as described in the NIST Special Publication 800-63-1 "Electronic Authentication Guidelines." This NIST publication defines a derived credential as "a credential issued based on proof of possession and control of a token associated with a previously issued credential, so as not to duplicate the identity proofing process."

In other embodiments, the system uses a subset of the combination of user and/or device authentications, and the detection and monitoring of acceptable proximity, the detection and monitoring of acceptable presence and acceptable possession to perform an inferred authentication In an embodiment, the system uses a user authentication, and a device authentication, and the detection and monitoring of acceptable proximity, and the detection and monitoring of acceptable possession to perform an inferred authentication.

In an embodiment, the system uses a user authentication, and a device authentication, and the detection and monitoring of acceptable proximity to perform an inferred authentication.

In an embodiment, the system uses a user authentication, and a device authentication, and the detection and monitoring of acceptable possession to perform an inferred authentication.

In an embodiment, the system uses a user authentication, and the detection and monitoring of acceptable proximity, and the detection and monitoring of acceptable possession to perform an inferred authentication.

In an embodiment, the system uses a device authentication, and the detection and monitoring of acceptable proximity, and the detection and monitoring of acceptable possession to perform an inferred authentication.

In an embodiment, the system uses a user authentication, and a device authentication to perform an inferred authentication.

In an embodiment, the system uses a user authentication, and the detection and monitoring of acceptable proximity to perform an inferred authentication.

In an embodiment, the system uses a user authentication, and the detection and monitoring of acceptable possession to perform an inferred authentication.

In an embodiment, the system uses a device authentication, and the detection and monitoring of acceptable proximity to perform an inferred authentication.

In an embodiment, the system uses a device authentication, and the detection and monitoring of acceptable possession to perform an inferred authentication.

In an embodiment, the system uses the detection and monitoring of acceptable proximity, and the detection and monitoring of acceptable possession to perform an inferred authentication.

In an embodiment, the system uses a user authentication to perform an inferred authentication.

In an embodiment, the system uses a device authentication to perform an inferred authentication.

In an embodiment, the system uses the detection and monitoring of acceptable proximity to perform an inferred authentication.

In an embodiment, the system uses the detection and monitoring of acceptable possession to perform an inferred authentication.

In an embodiment, the system uses a plurality of a first device or object, a second device or object, an external sensor system or network appliance, or a server to run components of the security system.

In an embodiment the security system components run as apps on a device, or as components of the operating system, or as part of a virtual machine running underneath or on top of the operating system, or as part of firmware in a hardware component of the device, including a motion coprocessor, a baseband processor, a graphics processor, or a neural processor, or within a protected container such as a trusted execution environment on a device, or on a server to which other system components connect over a network connection, or as a component or part of a network appliance such as a router, switch, bridge, or wireless access point.

In an embodiment, the rules for acceptability of proximity or acceptability of presence or acceptability of possession are specified by an authorized user of the device, or by an organizational administrator responsible for the device or the servers or networks or services to which it connects, or by a carrier or operator of a network to which a device connects, or by a manufacturer of the device or hardware or firmware components of the device, or a combination thereof.

In and embodiment, the security system performs an inferred authentication using a prior inferred authentication.

Actions in Response to Authentication and Authorization

In an embodiment, the security system takes various actions in response to a user authentication or a device authentication or the detection or monitoring of acceptable proximity, or the detection or monitoring of acceptable person presence, or the detection or monitoring of acceptable person possession of a device. The actions may be directed by any component of the security system, regardless of where the component is executing, and may affect any of the systems or devices upon which the security system is running, or other external sensor systems or network appliances or servers to which the devices are connected. The actions the security system takes include a plurality of: changing a security setting or state on a device; changing an operational setting or state on a device; modifying criteria regarding acceptable proximity, person presence, or person possession; locking or unlocking or suppressing the autolocking of a device; encrypting or decrypting or backing up or wiping data on a device; making, breaking, or altering characteristics of existing network connections or making new network connections; enabling or disabling or restricting access to or uninstalling or installing or executing particular applications or services on a device; enabling or disabling access to a particular network resource such as a website or a cloud service; obtaining a device's location and sending it to a server; obtaining audio or video or a photograph of the device's current user or environment, and sending it immediately or after a delay or in response to a request from a server for that information, to a server; providing or suppressing communications via voice calls or SMS or MMS or other text messaging or voice communications (such as VOIP) on the device; or controlling the operation of a protected data or application container on a device, including authorizing its use or preventing its use; assessing the device's security state or settings or vulnerabilities or presence of malware; or performing pre-configured operations such as running certain scripts or applications or system services which were configured by a user or administrator to be conditional upon the successful completion of an authentication operation, whether of a user or a device or an inferred user authentication.

In an embodiment, the security system modifies its criteria for acceptable proximity, person presence, or person possession in response to changes in the context of a plurality of devices upon which security system components are executing or to which they are connected via a network.

Other Example Use Cases

The following examples illustrate embodiments of the subject matter disclosed herein.

A. Automatic Unlock/Login when a Key Device is Detected

In this use case, the target device 200 is configured to be locked when it turns on or after a period of inactivity. When a key device 210 enters the target device's proximity, the target device 200 can determine that it is an allowed key device 210. When such is the case, the target device 200 can automatically unlock. When the key device 210 exits the proximity, the target device 200 automatically locks.

In an embodiment, the target device 200 can be a personal computer (PC) 112 and a mobile phone 101 can be the key device 210. The phone and the PC may use BLUETOOTH to communicate. The PC can be paired with key device(s) 210 in a configuration phase and therefore, they can authenticate each other. Once configured, the PC can monitor nearby BLUETOOTH devices and can connect to known paired devices, including key devices 210. One or both of the devices may be able to be connected ("page scan" mode) and one or both of the devices may frequently be trying to connect to the other. When a connection between the PC 200 and the phone 210 is complete, the simple act of a connection from a paired key device 210 may be sufficient to unlock the PC 200. In addition, at least a portion of the PC's storage can be encrypted, and when the connection is complete, the storage can be encrypted and/or decrypted by a key that is stored only on the key device 210.

Alternatively, additional authentication steps can be performed between the mobile phone and the PC prior to unlocking the PC. For example, the devices can validate each other's certificates. In addition, the phone and the PC can perform a challenge/response against previously exchanged public keys. When the connection is over an encrypted BLUETOOTH connection, authentication is provided implicitly. When the connection is over a local network, e.g., Wi-Fi hotspot, a network peer discovery protocol can be used to connect, and the devices 200, 210 can then perform mutual authentication (e.g. SSL with client and server certificates), or perform mutual authentication using a network broadcast protocol with challenge responses. In another embodiment, a provider of a Wi-Fi network service may have several logical or virtual networks set up using the same or different networking hardware. For example, a corporation may have two Wi-Fi networks set up, CORP-COMPANY-WI-FI (intended for official company PCs or other devices) and CORP-GUEST-WI-FI (intended for BYOD or personal devices of employees such as smartphones). Wireless Access Points can use the same hardware with different Access Control Lists (ACLs) which can filter or restrict traffic on the two different networks. In such a situation, the usual broadcast-based or multicast-based peer discovery protocols on LANs do not work; devices connected two the two different networks will not ordinarily see network broadcast traffic from each other, even though they are using the same networking hardware. In an embodiment peer network discovery between such devices is facilitated using additional ACLs which allow broadcast or multicast network traffic from a specific device, e.g., a user's smartphone, connected to a guest network, to be forwarded specifically to a different device, e.g., the user's PC, on a different network, the corporate network. In a different embodiment, peer network discovery between such devices is facilitated using additional ACLs which allow broadcast or multicast network traffic from a specific device, e.g., a user's PC, connected to the corporate network, to be forwarded specifically to a different device, e.g., the user's smartphone, on a different network, the guest network. In a different embodiment both devices are connected to a cloud-based or server-based rendezvous server to facilitate discovery across different networks. In another embodiment, the services of a peer-to-peer communications framework such as the AllJoyn framework from the AllSeen Alliance is used to accomplish the peer-to-peer discovery operation. In this specification, any of the above embodiments for peer-to-peer network discovery are used, and when reference is made to two devices being on or connected to the same network, it is intended to mean that they are on the same physical or logical network, or they have established network communication using a peer-to-peer discovery operation such as the ones described above. In a specific embodiment, two devices are enabled to be in communication on a network, even when they are on different physical or logical networks. In a specific embodiment, two devices can be on the same network because they are on the same physical network, but may be on different logical networks. In another specific embodiment, two devices can be on the same network because they are on the same logical network, but may be on different physical networks.

In another embodiment, prior to unlocking the PC 200, the phone/key device 210 must be in a specific state. For instance, when the devices 200, 210 initially connect via BLUETOOTH, the mobile phone 210 can provide its side of mutual authentication or the PC's encryption key only when its screen is unlocked. Once a connection is established, the phone 210 can continue to provide its side of mutual authentication even when its screen is locked. In this case, so long as the user 110 is using the PC 200 and so long as the devices are connected, the PC 200 remains unlocked. When the connection is broken, the PC 200 can automatically lock.

When the devices 200, 210 are connected but the user is not using the PC 200, it might be desirable to lock the PC 200 by terminating this connection. For example, when the user 110 sets the phone 210 down on the user's desk, and walks away from both the phone 210 and PC 200, it might not be desirable for the devices to continue providing mutual authentication because the user 110 is no longer in the vicinity. In this case, determining whether the user 110 is in the vicinity can be accomplished using sensors in the phone 210 that can sense when the phone 210 is placed on a stationary surface or when the phone 210 is on the user's person. For instance, an accelerometer can detect small motions as the user shifts position, or just breathes and can detect when the phone placed on the user's desk by identifying a SET-DOWN event, i.e., a downward spike in accelerometer reading, followed by relative inactivity of sensor.

In this case, if the phone 210 is placed on the desk, but the user continues to type on the PC keyboard next to the phone, the phone sensor can detect the ADJACENT-TYPING event and continue to authenticate because there is evidence that the user 110 is present. But if the user gets up and walks away, the phone sensors will show very little activity. In such a situation, e.g., no activity or interaction on either phone or PC, and evidence that phone is resting on desk and no user actions are going on in vicinity, the key device 210 can stop authenticating, which effectively breaks the connection between the PC 200 and the phone 210. In an embodiment, the inactivity timeout time can also be shortened for both devices 200, 210 and/or both devices can be automatically locked. Moreover, to verify the absence of the user 110, cameras on both the PC and the phone can be configured to search for the user 110 and when neither device senses the presence of the user 110, the PC can lock immediately regardless of the current lock/unlock state of either of the devices 200, 210.

In another embodiment, the phone can be the target device 200 and the key device 210 can be a Wi-Fi network. In this case, the phone 200 can be configured to unlock when the phone 200 connects to the network 210. In one embodiment, there is no special configuration of the Wi-Fi network, and the phone 200 uses the connection state of the network as a signal for proximity-based access control. In another embodiment, the device 200 interacts with the network infrastructure or a device on the network to properly authenticate the network 210, e.g. using EAP for mutual authentication. In either case, once the connection is terminated, the phone 200 can automatically lock.

B. Changing Security Settings when a Key Device is in Proximity

In this use case, the target device 200 typically implements various security measures such as locking the device 200 after a period of inactivity, controlling VPN tunnel traffic, controlling network traffic, and authentication requirements. According to an embodiment, when a key device 210 enters the target device's proximity, the target device 200 can automatically modify the security measures.

For example, when a PC is within range of a mobile device, e.g. connected to the same Wi-Fi access point or any other proximity detection mechanism, the PC's security setting can be changed to allow a 10 minute idle timeout before it automatically locks or to disable the idle timeout altogether. When the mobile device is not in range, the idle timeout can be changed to 30 seconds. In another example, one or more key devices 210 can be placed in a building structure as fixed proximity BLUETOOTH beacons. When target mobile devices and computers 200 come within the range of the key device(s) 210, the target devices 200 can automatically disable or lengthen their respective idle timeout mechanisms. As soon as the target mobile devices/computers 200 are not in proximity of the beacon(s) 210, they can change to automatic locking behavior.

In another example, the key device 210 is a local network that broadcasts data indicating to a target mobile device/ computer 200 that it is a secure network. In response to detecting the local network, the target device 200 can change its security settings regarding network traffic because it does not need to encrypt the traffic. Accordingly, data traffic, which would ordinarily be routed through a secure tunnel, e.g., a VPN, need not be routed in such a manner and can be routed directly via the secure network.

In an embodiment, when the key device 210 indicates that the user 110 is at work, or when the target device 200 detects the key device 210 and determines that the user is at work, the security settings of the device 200 can be changed to require a simple password be validated locally to unlock a locally stored encryption key. Otherwise, when outside of work, the security settings of the device 200 can require that the password be validated with a server to access its encryption key.

In another embodiment, an authenticated connection between the target device 200 and the user's home Wi-Fi network, indicating that device is at home in a secure location, can disable the lock mechanism on the device 200 to keep the device unlocked. Alternatively, there can still be a timeout lock for this scenario that may be longer than a normal lock timeout period. In this embodiment, when a user returns home and the device 200 automatically connects to the user's home Wi-Fi network, the device 200 will unlock automatically, or will have a button for "home Wi-Fi unlock" on the device unlock screen that can be pressed to unlock the device 200.

C. Access to Specific Network Resource when in Proximity

An organization may only want to provide access to a sensitive network resource when a computer or mobile phone is used from one of those organization's facilities. Traditionally, this problem is solved by putting the network resource on a private portion of the network, requiring devices wishing to access the network resource to be present on that private network segment. This can be accomplished by physically connecting devices to that network segment (e.g. ethernet or Wi-Fi), or by using a VPN to create a tunnel to that virtual network segment. Managing private network segments across multiple locations is problematic from a complexity standpoint, and oftentimes prevents administrators from locating services on public cloud infrastructure.

If a service is on a de-perimeterized network that does not have private network segments (e.g. has a publicly accessible IP address), the problem of access control based on a user device being on a particular organizationally owned network is solved by the device wishing to access the service retrieving a "proof" that it is on an allowed network and providing that proof to the service, which permits access if the proof is valid. For example, a local network may have a local service that is accessible only to devices on that local network that will sign requests with its private key. A device on that network receives a challenge request (e.g. random data) from a service it wishes to access, provides that challenge request to the local service, which signs the request and returns it to the device as a response. The device then sends the response to the service. The service validates the digital signature against a known valid public key for the local service (or valid certificate chain) to determine if the device is actually in proximity to the local network.

The local service may alternatively be a BLUETOOTH beacon in a facility.

The local service may be implemented as an overridden DNS entry on a local DNS server so that if a device attempts to resolve the service address outside of the network it either does not resolve or resolves to a public service whereas if the address is resolved inside the private network, it resolves to the private service.

A service may be integrated with a single-sign-on (SSO) provider that annotates a sign-on request with the security level or proximity information for the network. For example, if a user uses a SSO provider that relays secure information to a service to prove that the user has signed on (e.g. via HMAC or a digitally signed or otherwise authenticated bundle), the SSO provider may be implemented to also add information as to the location of the user's network by having two versions of the SSO service: one on the private network that is used when a user is on that private network (e.g. using the DNS method or other methods above) and another that is used when a user is on a public network. One will appreciate that a variety of other methods of informing the SSO service of proximity information for an accessing device is possible.

D. Network Infrastructure that Provides Proof of Proximity and Network Type

In this use case, a router or other piece of network infrastructure (e.g. small cell, switch, server on network) has a certificate and a private key, which can be issued at manufacture time or provisioned by administrator. A discoverable network service is provided where clients issue requests to be signed that prove that the client is connected to that network. Clients can receive a signed response and provide that to a web service, which receives the signed token and is configured to detect fraud. When fraud is detected, the authenticity of the network can be less trustworthy. Networks that have low incidences of fraud increase the confidence that the device is in a secure location. Certificates may state that the router is a home router vs. a hotel vs. public location. The service can make decisions, e.g. route all traffic over SSL, based on the type of network the user is connected to.

E. Tiered Access Control to a Device or Service

According to an embodiment, a simple password can be required when the device is in proximity of a trusted network. Otherwise, a multi-factor authentication (e.g. password+proximity token or rotating key token [e.g. RSA SecurID]) can be required if the device not in proximity to a trusted network.

In another embodiment, a server can require less authentication when on a trusted network. This can be based on a source IP address of the device. When the server is on a private network segment, the virtue of being able to connect to it is different than if a device connects to a public server.

F. Alert when Device Leaves Proximity

A target device can detect proximity of a nearby key device. When the target device detects that the key device leaves its proximity, it creates an alert. The alert can be a loud sound, a vibration, a message transmitted to a server, and/or a combination of any of the above. In an embodiment, the target device can also retrieve its current location and store that location locally or on a server so that, later, a user can see where the key device was last in proximity to the target device. When the key device comes back within proximity, the target device can be configured to terminate the alert.

According to an embodiment, the target device can determine whether the key device leaves its proximity in an expected way (e.g. powered off) or in an unexpected way (e.g. no longer in range). In this case, the target device can differentiate its behavior based on this determination. For example, no alert will be created and a silent record of the location of the proximity leaving event if the key device leaves proximity in an expected way, and if the key device leaves proximity in an unexpected way, a loud sound is emitted.

In a BLUETOOTH implementation environment, determining when a device leaves the proximity of another device can be based on pings, e.g. L2CAP Echo (see http://www.palowireless.com/bluearticles/adapt.asp), or 2-way RFCOMM echo/echo response protocol (see http://code.google.com/p/btstack/wiki/RFCOMM) and when too many timeouts in a row occur. Determining whether the leaving is unexpected or expected can be based on a disconnect reason (BLUETOOTH differentiates between a remote side initiated disconnect and a link failure). In an embodiment, the BLUETOOTH controller can inform its host when a remote device is not responding before it has reached a timeout state. Accordingly, the device can determine the earliest point when the other device left its proximity.

G. Multiple Proximity Technologies can be Used

According to an embodiment, any combination of the proximity techniques described above can be used to determine the presence of the key device 210. For example, a combined NFC/BLUETOOTH technique can be used. In this case, a target device may require both a BLUETOOTH connection and an NFC connection to the key device to log a user into that device. NFC range has physical limitations while BLUETOOTH has higher throughput so it can engage in larger data exchanges.

Alternatively or in addition, a first proximity technology can be used to detect the presence of the key device and a second proximity technology can be used to detect the absence of the key device. For example, a target device can use NFC to determine proximity to the key device to log a user in because of the short range physical proximity needed, but can use BLUETOOTH to maintain the persistent proximity detection because it does not require that the key device be kept in very close proximity.

According to an embodiment, the target device 210 can utilize an inductive proximity technology, such as NFC, to draw power from the key device to charge its own battery. For example, when the target device 200 is in the range of an NFC field of the key device 210, the target device can use inductive coupling to both charge its battery and to transfer the NFC data. In an embodiment, the key device can be a wallet-sized card that contains a slim battery and a radio and that is configured to communicate using both NFC and BLUETOOTH technologies.

H. Anti-Theft Mechanism

In an embodiment, a PC or mobile device (e.g., an iPad used for a restaurant menu, a POS terminal, a corporate on-premise laptop) is locked and inaccessible if not in proximity to a key device/beacon/other network. In an embodiment, the only way to unlock the device can be by proximity, and no other alternative login mechanism is available. After a certain period of time, the target device may wipe its contents or render the hardware inoperable if not brought within proximity to the key device/beacon/other network.

I. Using the Key Device to Secure Encryption

An encrypted device, e.g., a PC or mobile device, typically does not have direct access to its own encryption keys because when encryption keys are stored directly on the encrypted device, they can be discovered using forensic analysis and the encrypted data can be compromised. Typically, the encryption keys are stored in a secure hardware element on the device, or on a server which requires network connectivity to decrypt the device. Alternatively, password-derived keys (e.g. PBKDF2) are used which make the strength of the encryption only as strong as the user's password which, much of the time, has a low degree of entropy.

In this use case, however, the key device stores an encryption key or keying material that is used to decrypt an encryption key. Accordingly, when a user wishes to access encrypted data (e.g. opening a secured application, logging in or booting up the encrypted device, accessing a secure file/folder), proximity to the key device is required so that the encrypted target device can receive the encryption key or can receive keying material useful to produce the encryption key (e.g. if the encryption key is stored on the encrypted device but encrypted with a secondary key stored on the key device, or if the data is encrypted using M of N keying so that multiple subkeys are needed to actually decrypt the data on the encrypted device). In order to protect the key device's encryption key or keying material, the key device authenticates with the encrypted target device. This may be built into the proximity detection mechanism (e.g. BLUETOOTH) or performed at the application layer using SSL or a challenge response mechanism.

J. Verified Geo-Location

In an embodiment described above, the security settings of the target device 200 can change based on the target device's 200 geo-location. In some cases, the geo-location mechanism in the target device 200 can be manipulated to fool the system so that the security settings can be changed to allow access to resources when such access should be denied. For instance, some agent on the target device 200 can provide spurious, incorrect geo-location information, so as to obtain access to information or services that are accessible only when the target device 200 is in a specific geo-location or region.

To prevent this, in an embodiment, the key device 210 can include a geo-location security mechanism that is configured to verify a geo-location of a nearby target device 200. In an embodiment, the target device 200 can be configured to determine its geo-location information and to transmit it to the key device 210 comparison and verification. The geo-location security mechanism in the key device 210 can be configured to receive the geo-location information from the target device 200, and to verify the target device's location against either a known location or its own determined geo-location. When the received geo-location information matches the known location of the key device 210, the geo-location security mechanism can digitally sign the target device's geo-location information and provide the signed location information either directly to the secure system or service or network element requiring the geo-location verification, or indirectly via the target device 200. Because the information is digitally signed, it cannot be impersonated, altered, or replayed.

When the target device is not configured to determine its geo-location information, the target device can transmit a request for its geo-location to the key device, which can then return a digitally signed geo-location. In an embodiment, as an added measure of security, the target device 200 can transmit the signed geo-location to a server which can verify the digital signature to determine that the geo-location is authentic.

In another embodiment, a GPS satellite system can physically transmit digitally signed messages so that when the target device 200 is not within the beam of the satellite's transmitter, it cannot receive the digitally signed messages. Alternatively, the target device 200 can include a hardened GPS hardware or software module that is physically and/or digitally secure from tampering. This module can receive GPS and digitally signs its results before providing them to other physical or digital components on the device 200. For example, a GPS radio on a device, may receive an instruction to start acquiring a position. When the GPS returns its position, it digitally signs the position data and the current time using a digital certificate it has embedded in it before transmitting it on a hardware bus or putting the position data into memory. In an embodiment, each GPS device has a unique digital certificate that is signed by a certificate authority. A consumer of the location information can then verify the authenticity of GPS locations signed by devices in the field. If a single device is compromised, its certificate can be revoked without resulting in the compromise of other devices.

K. Building Authentication

Typically, current building access control systems do not monitor proximity. Rather, they merely register that somebody has been in the proximity of an access control device, e.g., when they swipe a card at an access control device such as a turnstile, secure door, or elevator. In this case, the detection is that a user has recently badged into the building. For example, if it is a Monday morning, and the user has been out of the office for 12 hours, the system will not let that user access any resources on the corporate network until the user swipes his or her badge at the building access control elevator/door/etc. Alternatively, instead of blocking logins, the logins will throw an alarm for building or IT security.

In this use case, the key device 210 can be configured to interact with the building access control system and thereby can provide evidence that the user 110 is present in the building. In an embodiment, the key device 210 can be a badge or magnetic card that includes proximity technology (e.g. HID, MIFARE, ISO-14443) and that can be detected when it is presented/swiped at an access control device such as a turnstile, secure door, or elevator. Other access control devices can include security cameras and motion detectors, which can be used to correlate physical entry into a building, physical presence (based on motion detection, facial recognition, gait recognition or other identification technologies), and digital presence (login to a mobile device or computer). When a request to access resources in the building is received by a server, the building access control system can determine whether the key device 210/user 110 has been detected, and if so, can grant access to the resources. When the key device 210/user 110 has not been detected, the server can deny access to the resource.

In an embodiment, if the building access control system has not detected the user's presence for a specified amount of time, the system can prevent the user 110 from accessing any resources on the corporate network until the user swipes his or her badge at the building access control elevator/door/etc. Alternatively or in addition to blocking logins, the logins can throw an alarm for building security.

In another embodiment, when the key device 210 is detected by the building access control system, a message can be transmitted to a server from the building access control system. Moreover, whenever a user logs into a computer, the computer can transmit a message to the server informing the server of the login. In an embodiment, based on the messages from the computer and from the building access control system, the server can determine whether the computer is being accessed remotely when the messages from both the building access control system and the target computer indicate that the user's key device 210 was not detected or has not been detected recently. Alternatively, the server can determine whether the computer is being accessed in an unauthorized way when the message from the building access control system detects the presence of the user in the building but the message from the target computer does not detect the user's presence. In this case, the server can interact with a calendaring system to determine if the user 110 is supposed to be on vacation or elsewhere.

In another embodiment, when the user's key device 210 is detected, the building access control system can change various security settings in the building that are associated with the user 110. For example, the user's PC 140*a* can be unlocked, the user's office door can be unlocked. Moreover, the copy machine or coffee machine or lock for the kitchen pantry may require proof that an authorized user is the one accessing the resource. Such resources may not themselves have proximity sensors or logic that permit them to directly sense the presence/proximity of the user's key device 210. Nevertheless, they may have a communication connection to the building access control system, which does have a distributed capability to sense location and relative proximity of the user's key device. By knowing that location, plus knowing the preconfigured or dynamically detected location of the resource for which access is being attempted, the resource can make the determination whether the user's key device is in proximity to the resource where the access attempt is occurring.

In another embodiment, the building may also have compartmentalized security areas. For example, if there are multiple rooms, or points of security, then a computer in one area may automatically lock when the user leaves one area. For example, a user works in an office area and there is one point of security between that area and a kitchen. When the user uses his or her key to access the kitchen, his or her computer automatically locks and/or a server automatically logs him or her out. In an embodiment, when the user re-enters the secure area, the computer unlocks and/or the server logs him or her back in.

L. Automatic Logout/Security Change when Key Device is not Near

A target device may be configured to automatically lock when a key device leaves its proximity regardless of whether the proximity of the key device is used as a login mechanism. In an embodiment, the target device can be configured to use a particular distance range of communication that is acceptable; the distance range can be estimated by signal strength of the communication. The target device traveling beyond the configured distance from the key device either locks immediately or begins a configurable countdown timer until the device is locked.

Alternatively or in addition, a device's camera can be used to detect whether a user is sitting in front of the computer and used to log a user out if there is no user directly in front of the computer. Multiple logout methods can be combined to minimize the chance of unauthorized access (e.g. inactivity, proximity, and camera-based detection). In another case, a pad that includes an NFC reader or tag can be provided so that a device on or near the pad can act as a reader or tag and determine proximity to the pad. When the device is no longer in proximity to the pad, the device changes security behavior, e.g. turns on activity timeout, lock, changes level of login required.

M. Context Related Key Devices

In an embodiment, different types of key devices for different contexts can be provided, which when detected, can change the behavior of the target device 200 to suit the context. For example, when a key device is associated with and in the user's car; its detected presence implies that the user is in the user's car and device settings can auto adapt, e.g., enabling a BLUETOOTH connection to an in-car hands-free device.

In another embodiment, the target device can be connected to an NFC key device 210 embedded in a tabletop or bar surface can be used, and when the target device is moved beyond the near field of the key device, a movement alarm can be activated for the target device and/or alternate means of identification will be required. In an embodiment, another device of the user or of a friend can be the key device for login or for alarm. Alarms can be configured to notify other devices such as phones of a friend in a group that is out together.

Other devices such as PCs can be auto logged in by the key device directly or indirectly by a device that is logged in directly. For example, when the key device is detected by the target device, the target device can communicate to the nearby PC that the user is nearby and that the PC should be logged in with the user's login credentials. In this scenario, a person sitting in front of the user's personal or home PC will see the PC automatically log the user in.

N. Onetime or Limited Access Passwords

Onetime or limited access passwords can be setup for a friend or family member to access the user's target device for a limited set of apps, app groups (e.g., games or news or books) or other features. A different key device can be associated with a limited login (e.g., a family member's key device can be associated on the primary user's target device with a limited purpose login).

Different phone settings or app activations/deactivations can be triggered by detected presence of context key devices. This can include communications flows that are triggered by the detection of a key device. For example, when the target device detects a key device for a building elevator or door, the target device can initiate a preconfigured communication with an external system to authenticate to that system, which directs the elevator to go to the user's primary authorized floor or the door lock to open the door.

O. Login Via a Service

In an embodiment, when the target device 200 is locked and the user 110 wishes to log in, or when the user 110 is using the target device 200 to log in to a web-based service, login credentials and/or form data can be automatically provided by the key device 210 when the target device 200 detects the presence of the key device 210. In an embodiment, the target device 200 can transmit a request for the information to the detected key device 210 and the key device 210 can return the information to the target device 200. In the website case, the credentials can be presented by the target device 200 to the website. Thus, in this embodiment, the key device 210 can be a password manager that is accessed by an agent on the target device 200.

In another embodiment, the target device 200 can require multiple levels of authentication from sources including multiple key devices 210. In this case, the target device 200 can require user interaction/input in addition to detecting the presence of more than one key device 210 associated with the user 110.

Alternative Architectures

The various processes described above make reference generally to the embodiment of FIG. 2, where the target device 200 runs an operating system 209. Applications 208 are installed on the device, stored using the file system 203 of the device, and run under the control of the OS 209. In that embodiment, the provision of the proximity based control system 202 and of the applications 208 on the target device 200 allows for local operation and management of these functions. In another embodiment, the applications may be located elsewhere, and in particular, on a server device or system interacting with the target device 200. The following configurations rely on applications installed only on the server, with files stored in the file system of the server.

Figure 6A:
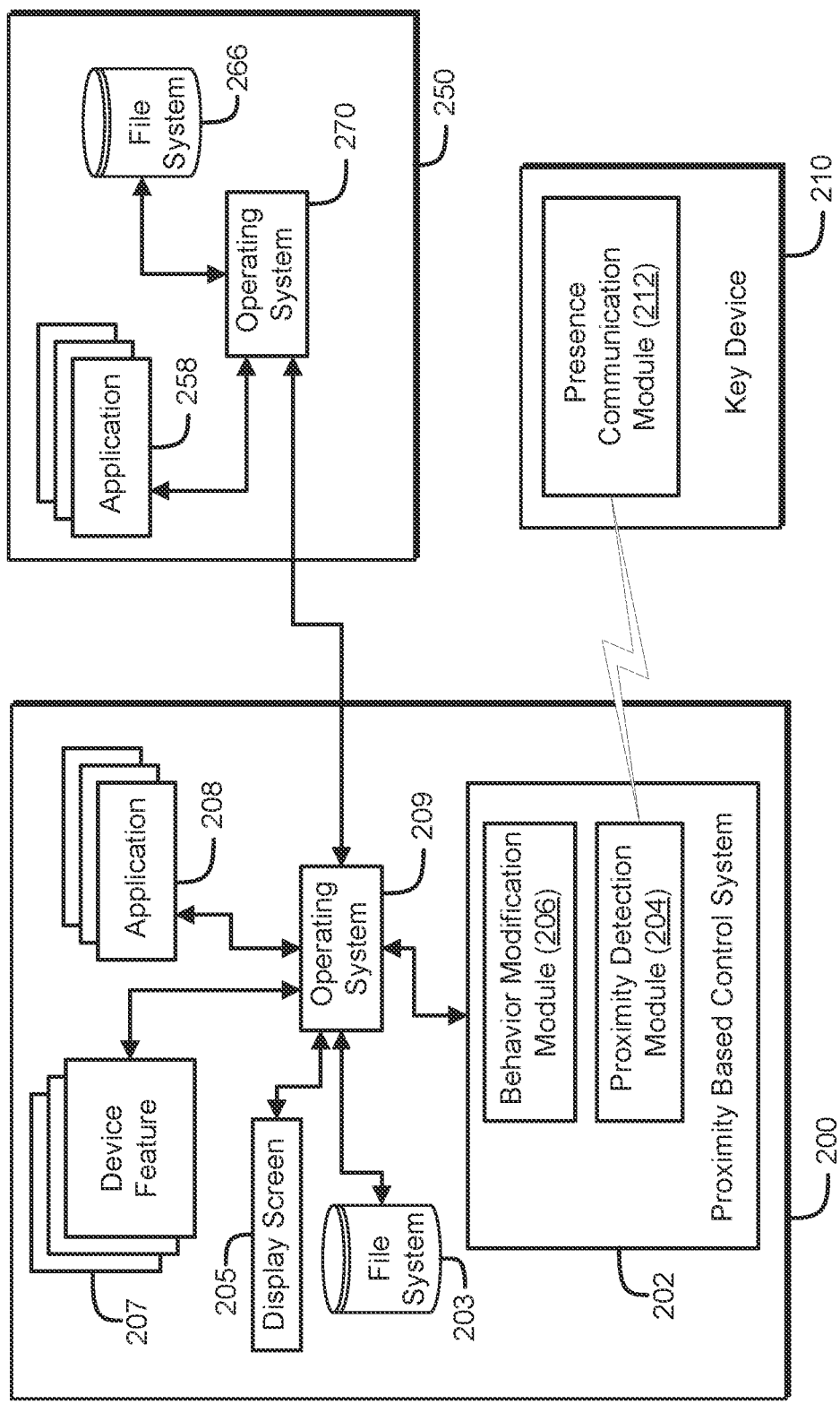
FIG. 6A is a block diagram illustrating an alternative implementation of a system of the invention according to an embodiment.

FIG. 6A illustrates another embodiment of the system for changing a security behavior of a device based on proximity of another device, according to an embodiment. As in FIG. 2, the target device 200 has a processor controlled through an operating system 209 selectively running various applications 208. Also included are a display screen 205 and a file system 203. In this embodiment, however, there is an associated server 250 coupled with the target device 200. The server 250 has its own operating system 270 and corresponding file system 266, as well as applications 258. The server 250 in this embodiment is intended as a master control point for the device 200, as well as any other of the user's devices. Thus, rather than having particular applications installed and running on the target device 200, these applications 258 are installed on the server and controlled from the server 250. This may be viewed as a particular form of virtualization. Applications 258 in this architecture are not installed as applications 208 directly on the device 200. Rather, they are installed as applications 258 on the server 250, and stored in the file system 266 on the server 250.

When a user 110 wants to run an application 258, the target device OS 209 requests that the server OS 270 provide the necessary files, such as application executables and associated data, to the target device 200. The server OS 270 sends the necessary files to the target device OS 209 in response to the request. The device OS 209 stores these files temporarily in the file system 203, and then executes the application. Any modifications to the files made while the application is running on the target device 200 may be either immediately sent to the server 250 so that the modifications can be made immediately to the corresponding file(s) on the server, or saved and dealt with at a later time, which may be after the application has finished running, or is still running, at which time the modifications are sent to the server 250 so that a decision can be made whether to make the corresponding modifications, and to do so if appropriate. Such decisions may be made based on security and privacy policies in place on the server.

After the application has finished running, the files on the target device 200 are marked for removal, which may happen immediately or at a later time. If the same application is initiated again while the necessary files still reside on the device (e.g., the files have not yet been removed), and the files are the same version, then the device 200 can use these local copies rather than requesting copies of the necessary files again from the server 250. In this way, the local file system 203 on the device acts like a local cache for the necessary files, but the definitive and permanent version of the application resides on the server 250 and its file system 266. In this embodiment, the device 200 does not interact with the server 250 with regard to proximity and/or login.

Figure 6B:
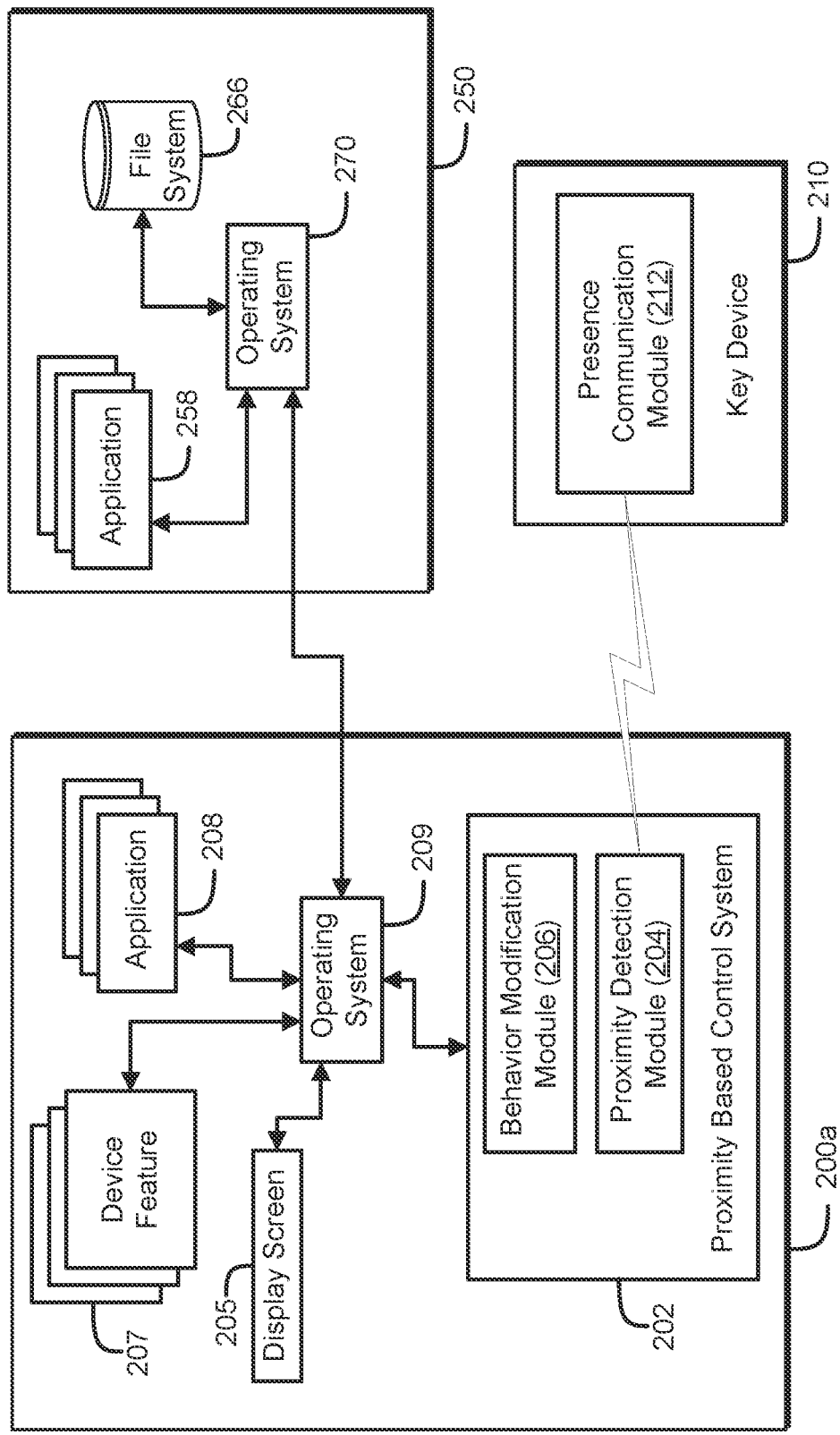
FIG. 6B is a block diagram illustrating an alternative implementation of a system of the invention according to another embodiment.

FIG. 6B illustrates another embodiment of the system for changing a security behavior of a device based on proximity of another device, according to an embodiment. This embodiment is similar to FIG. 6A in that server applications are permanently installed and run from the server 250, and not directly on the device 200. However, in this embodiment there is no local file system on the target device 200a, so that executable files and associated data cannot be locally stored on the device 200a. Instead, any necessary files requested from the server OS 270 are placed directly into memory on the device 200a and executed. Any file reads or writes by applications running on the device 200a are directed by the target device OS 209 via the server OS 270 to the server file system 266. No application data is stored locally on the device 200a, only in the file system 266 on server 250. Applications exist in the memory of the device while they are being executed or prepared for execution, but after the application has ended, these sections of memory are marked for removal/reuse. If an application is initiated again by the user while a copy of the application executables remains in memory, and it is the same version as is held by the server 250, then the device OS 209 may simply use that local memory copy rather than requesting it again from the server 250. In this configuration, the device 200a is a pure execution engine for applications and has no permanent file system. Moreover, the device 200a does not interact with the server 250 with regard to proximity and/or login.

In the embodiments of FIGS. 6A and 6B, any network operations from a running application on the device 200, 200a may optionally be routed through the server 250 so that the server OS 270 (or special applications running on the server) can provide security and/or privacy operations on network communications initiated by the running application. Such a configuration is an alternative to network operations being conducted directly from the device 200, as in FIG. 2.

Figure 6C:
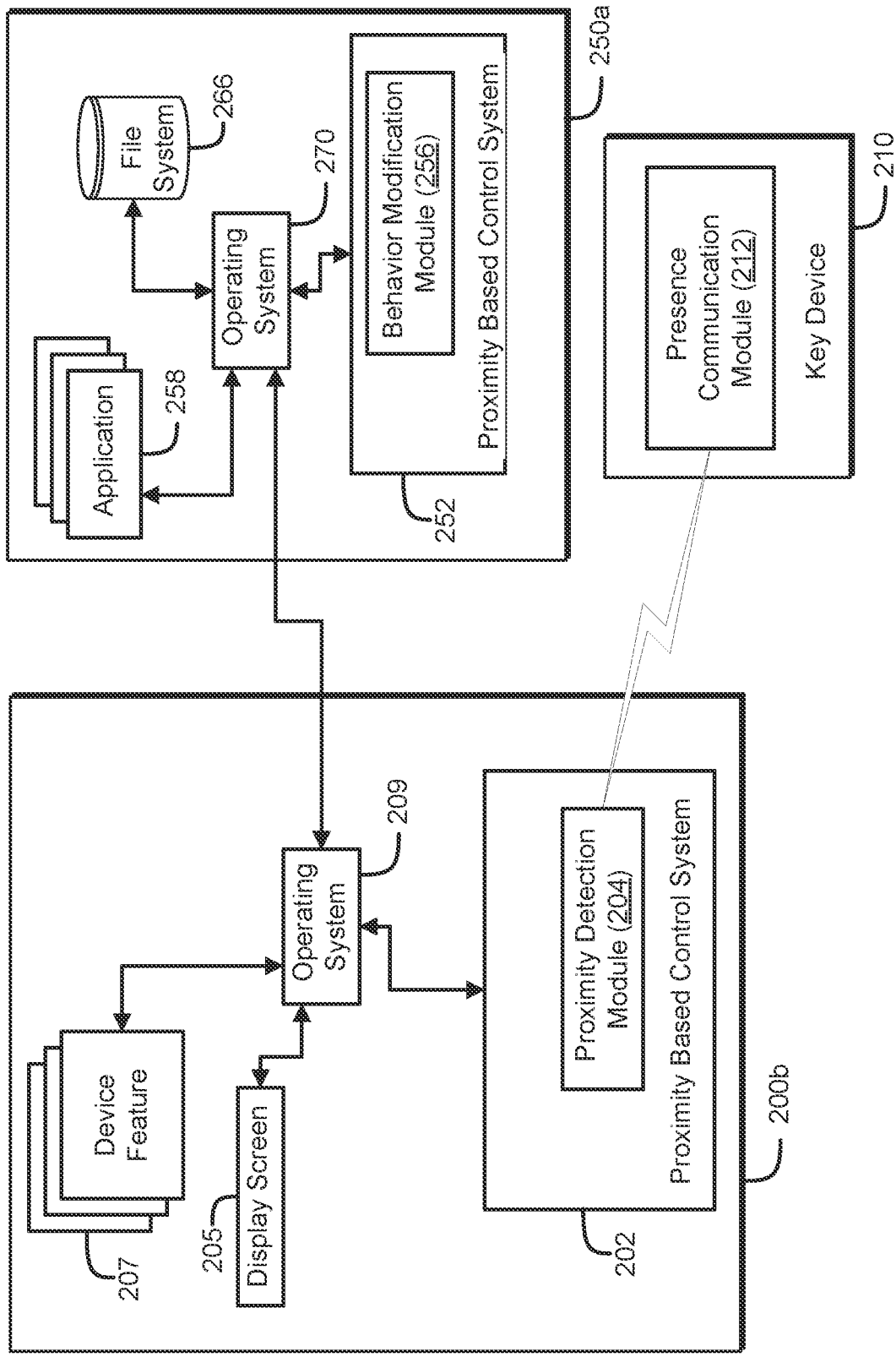
FIG. 6C is a block diagram illustrating an alternative implementation of a system of the invention according to yet another embodiment.

An alternative embodiment is shown in FIG. 6C, where applications 258 are installed and run on the server 250a, and executable files and associated data files are stored in the file system 266 of the server. In this embodiment, the target device 200b does not run the applications on the device OS 209 at all, but instead, the applications 258 are run on the server OS 270, and requests by the application to draw to screen are sent by the server OS 270 to the device OS 209, with the drawing operations taking place on the display screen 205 of the device 200b. Requests by the application 258 for user input, such as touch, taps, typing, etc., are sent from the application 258 via the server OS 270 to the device OS 209, and the user input is gathered from any local sensors or devices configured on the device 200b (e.g., from a touch screen on the device). In this configuration, the device 200b is a pure display and user interaction engine for applications, and does not run applications on the device 200b.

According to an embodiment, the device 200b can interact with the server 250a with regard to proximity and/or login. In this case, the server 250a is the device actually running the application (with the display appearing on device 200b). User interaction occurs on device 200b (and local sensors/communications such as NFC or BLUETOOTH), with all inputs passed along for processing to server 250a. When the device 200b senses the presence of the key device 210, it can send the sensed information to the server 250a for processing. In an embodiment, the function of the proximity based control system 202, 252 can be distributed between the device 200b and the server 250a in that the display, interaction, communications, and sensor features are operating on the device 200b via the proximity detection module 204 and the security behavior modification features are operating on the server 250a via the behavior modification module 256. Alternatively, the proximity based control system 202, in an embodiment, can operate independently on device 200b.

All of the alternative embodiments described above can all be viewed as a form of containerization. Containerization, or sandboxing, is a technique of program isolation used to enforce security or privacy policies. In each of these alternative embodiments, some or all of the executables and/or data reside on the server 250, and not on the target device 200. Therefore, an enterprise could use any one of these alternative architectures as a containerization solution. For example, the user's personal applications 208 could be installed upon and run conventionally on the device 200, but all enterprise data and applications 258 could be run from one of the server-based architectures of FIGS. 6A-6C. All existing types of mobile containerization are vulnerable to attacks against data that is physically stored on the device 200. Nonetheless, in the alternative embodiments described above, there is no permanently stored application data on the device, and thus the threat to data security is reduced.

There are generally three types of sandboxing:
Type 1: a hypervisor upon which one or more virtualized operating systems run that are completely sandboxed;
Type 2: in which a virtualization layer runs atop the native operating system on a device, and a guest operating system (and applications within it) run within that virtualization layer; and
Type 3: application wrappers, content wrappers, and work space wrappers, which tend to be application-oriented types of virtualization that are functionally oriented and although similar to type 2 do not represent a full virtualization layer with a guest operating system. In this case, the work space itself is an application which runs other applications and enforces isolation (see, e.g., "Mobile Device Sandboxing 101," http://fixmo.com/blog/2012/05/11/mobile-device-sandboxing-101).

Any of the three types of containerization can be employed on the server side in conjunction with any of alternative architectural models described above.

In addition, any of the three alternative configurations described above with reference to FIGS. 6A-6C could be implemented in a base configuration, that is, with all modifications made to the operating system on the device. Alternatively, any of three hybrid configurations could be implemented with modifications made to the operating system on the server. For example, in a Type 1 containerization scenario, one of the virtualized operating systems is a modified operating system on the server. A Type 2 containerization scenario may have a virtualization layer running atop the host operating system which contains a guest operating system that is a modified operating system on the server. A Type 3 containerization scenario may have an application wrapped so as to virtualize access to files, displays, and sensors.

In a specific implementation, a method includes while a mobile communications device is locked and connected to a network, detecting, by a proximity detection module in the mobile communications device, that a key device is connected to the same network as the mobile communications device, in response to the mobile communications device and the key device being connected to the same network, unlocking, by a behavior modification module, the mobile communications device, after the step of the unlocking, by the behavior modification module, the mobile communications device, determining that the mobile communications device and the key device remain connected to the same network, and based on the determination, maintaining, by the behavior modification module, the mobile communications device in an unlocked state. In a specific implementation, the detecting may be triggered when the mobile communications device is powered-on or is woken from a sleep or power-saving state. The detecting may occur while electronic display of the mobile device is turned off.

The method may further include detecting, by the proximity detection module, that the key device is no longer connected to the same network as the mobile communications device, and in response to the key device no longer being connected to the same network, locking, by the behavior modification module, the mobile communications device.

The method may further include upon expiration of a time period of inactivity after which the mobile communications device will be locked, checking whether the key device is connected to the same network as the mobile communications device, if the key device remains connected to the same network, not locking the mobile communications device, and if the key device is no longer connected to the same network, locking the mobile communications device.

The method may further include after the step of unlocking the mobile communications device, periodically checking, by the proximity detection module, whether the key device is connected to the same network as the mobile communications device, if a periodic check indicates that the key device is not connected to the same network as the mobile communications device, locking the target device, and if the periodic check indicates that the key device is connected to the same network, not locking the mobile communications device.

The key device may include glasses or eyeglasses.

The step of unlocking the mobile communications device may include unlocking the mobile communications device into a first mode having a first level of functionality, and the method may further include while the mobile communications device is in the first mode, receiving an unlock code, if the unlock code is correct, unlocking the mobile communications device from the first mode to a second mode having a second level of functionality, greater than the first level of functionality, and if the unlock code is incorrect, maintaining the first mode on the mobile communications device. The mobile communications device may include an operating system.

In a specific implementation, the step of detecting that the key device is connected to the same network as the mobile communications device includes receiving a message broadcast from the key device, wherein the message comprises a Media Access Control (MAC) address that matches a MAC address stored at the mobile communications device.

In another specific implementation, the step of detecting that the key device is connected to the same network as the mobile communications device includes broadcasting a message from the mobile communications device over the network for the key device, and receiving a reply from the key device responsive to the broadcasted message.

In a specific implementation, a method includes determining, by a proximity detection module in a mobile communications device, whether a key device is near the mobile communications device, and if the key device is not near the target device, allowing, by a behavior modification module in the mobile communications device, an unlock screen to be presented on an electronic display of the mobile communications device.

The method may include if the key device is near the mobile communications device, bypassing the unlock screen. Bypassing the unlock screen may include allowing a screen following an unlock code to be displayed on the electronic screen of the mobile communications device without the unlock code having been inputted to the mobile communications device. The screen following the unlock code may be referred to as a homepage or homescreen.

In a specific implementation, the method further includes determining that the key device is near the mobile communications device, after the determination, allowing the unlock screen to be presented on the electronic display of the mobile communications device, receiving an unlock code input into the unlock screen, if the unlock code is correct, unlocking the mobile communications device into a first mode based on the unlock code being correct and the key device being near the mobile communications device, if the unlock code is incorrect, unlocking the mobile communications device into a second mode based on the unlock code being incorrect and the key device being near the mobile communications device, where a level of functionality of the mobile communications device in the second mode is different from a level of functionality of the mobile communications device in the first mode.

A number of functions available on the mobile communications device in the first mode may be greater than a number of functions available on the mobile communications device in the second mode.

In a specific implementation, the method includes determining that the key device is near the mobile communications device when the key device and the mobile communications device are connected to the same access point.

In another specific implementation, the method includes determining that the key device is near the mobile communications device when a strength of a signal from the key device is above a threshold value.

In another specific implementation, the method includes determining that the key device is near the mobile communications device when the key device and the mobile communications device are in the same geographical area.

In a specific implementation, a method includes displaying on an electronic screen of a mobile communications device an unlock screen comprising an input box for an unlock code, and an option to check for a presence of a key device, receiving a selection of the option, checking, by a proximity detection module of the mobile communications device, for the presence of the key device, if the presence of the key device is detected, unlocking the mobile communications device without receiving the unlock code, and if the presence of the key device is not detected, not unlocking the mobile communications device.

In a specific implementation, the step of unlocking the mobile communications device includes unlocking the mobile communications device into a first mode having a first level of functionality, while the mobile communications device is in the first mode, receiving the unlock code, if the unlock code is correct, unlocking the mobile communications device from the first mode to a second mode having a second level of functionality, different from the first level of functionality, and if the unlock code is incorrect, maintaining the first mode on the mobile communications device.

In a specific implementation, the step of unlocking the mobile communications device includes after expiration of a time period of inactivity after which the mobile communications device will be locked, checking whether the key device is near the mobile communications device, if the key device is near the mobile communications device, not locking the mobile communications device, and if the key device is no longer near the target device, locking the mobile communications device.

CONCLUSION

Some specific flows are presented in this application by way of example, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other implementations may not be exactly the same as the steps presented and may be modified or altered as appropriate for a particular process, application or based on the data.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment.

We claim:

1. A method comprising:
   authenticating, by a first computing device, a user;
   determining an authentication, by a first security component executing on the first computing device, that the user is authenticated;
   determining a pairing, by the first security component, that the first computing device is paired with a second electronic device;
   determining, by the first security component, that the user has been in control of the first computing device from the authentication to the pairing with the second electronic device; and
   causing, by a second security component executing on the second electronic device, the second electronic device to change to an unlocked state when:
   the first security component informs the second security component that the user is authenticated and has been in control of the first computing device from the authentication to the pairing with the second electronic device;
   the second security component determines, from interpreting visual data provided by the second electronic device, that the user exceeded a threshold distance from the second electronic device and returned within the threshold distance from the second electronic device after a first period of time; and
   the second security component determines, from interpreting the visual data, that the user was in continuous possession of the first electronic device during the first period of time.

2. A method comprising:
   authenticating, by a first computing device, a user;
   determining an authentication, by a first security component executing on the first computing device, that the user is authenticated;
   determining a pairing, by the first security component, that the first computing device is paired with a second electronic device by confirming that the second electronic device has been previously paired with the first computing device;
   determining, by the first security component, that the user has been in control of the first computing device based on continued presence data detected by the first security component;
   generating a derived credential, by the first security component, in response to the first security component determining that the user is authenticated, that the second electronic device is paired with the first computing device, and that the user has been in control of the first computing device;
   transmitting the derived credential to the second electronic device; and
   causing the second electronic device to change to an unlocked state without requiring any action by the user.

3. The method of claim 2, the derived credential comprising at least one of a protected key or a cryptographic proof of knowledge of an authorizing key.

4. The method of claim 2, the determining that the user has been in control of the first computing device comprising confirming that the user has been in possession of the first computing device via a predetermined possession method selected from the group of: detecting a predetermined interaction with an input device of the first computing device, detecting that the first computing device is in motion, or receiving biometric signals from the user.

5. The method of claim 2, further comprising:
   continuing to monitor, by the first security component, the proximity between the first computing device and the second electronic device after the first computing device enters the locked state;
   comparing, by the first security component, subsequent presence data, received from the first computing device after the first computing device enters the locked state, and the continued presence data; and
   causing, by the first security component, the first computing device to enter an unlocked state when the proximity is less than the predetermined proximity threshold data and the subsequent presence data is determined to match the continued presence data based on the comparison.

6. The method of claim 2, the continued presence data including
   a notification, from the second electronic device, that interaction is taking place with input devices of the second electronic device.

* * * * *